US012106103B2

(12) United States Patent
Yagi et al.

(10) Patent No.: US 12,106,103 B2
(45) Date of Patent: Oct. 1, 2024

(54) INFORMATION PROCESSING DEVICE, CONTROL METHOD, AND NON-TRANSITORY COMPUTER READABLE MEDIUM

(71) Applicant: OMRON CORPORATION, Kyoto (JP)

(72) Inventors: Daisuke Yagi, Kyoto (JP); Toru Murata, Kyoto (JP); Atsushi Kamimura, Kyoto (JP); Yasuo Muneta, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 17/795,780

(22) PCT Filed: Apr. 7, 2020

(86) PCT No.: PCT/JP2020/015668
§ 371 (c)(1),
(2) Date: Jul. 27, 2022

(87) PCT Pub. No.: WO2021/157103
PCT Pub. Date: Aug. 12, 2021

(65) Prior Publication Data
US 2023/0055743 A1 Feb. 23, 2023

(30) Foreign Application Priority Data
Feb. 4, 2020 (JP) .................. 2020-017052

(51) Int. Cl.
*G06F 9/30* (2018.01)
*G06F 11/14* (2006.01)
*G06F 11/16* (2006.01)

(52) U.S. Cl.
CPC ........ *G06F 9/3004* (2013.01); *G06F 11/1497* (2013.01); *G06F 11/1608* (2013.01);
(Continued)

(58) Field of Classification Search
CPC ............... G06F 9/3004; G06F 11/1497; G06F 11/1608; G06F 11/1633; G06F 11/14; G06F 11/16
See application file for complete search history.

(56) References Cited

U.S. PATENT DOCUMENTS 10,423,417 B2 * 9/2019 Bailey .................... G06F 11/00
2011/0208997 A1 8/2011 Czajkowski
(Continued)

FOREIGN PATENT DOCUMENTS

JP 04-071038 A 3/1992
JP 11-296394 A 10/1999
(Continued)

OTHER PUBLICATIONS

Lima et al.; Designing Fault Tolerant Systems into SRAM-based FPGAs; 2003 (Year: 2003).*
(Continued)

*Primary Examiner* — Corey S Faherty
(74) *Attorney, Agent, or Firm* — Sughrue Mion, PLLC

(57) ABSTRACT

An information processing device that executes an arithmetic process includes a first processing circuit and a second processing circuit. The first processing circuit executes the arithmetic process N times consecutively. The second processing circuit executes the arithmetic process N times consecutively. N is an integer of 2 or more. The first processing circuit and the second processing circuit continue to operate according to a match between at least one result among the results of the N arithmetic processes executed by the first processing circuit and at least one result among the
(Continued)

results of the N arithmetic processes executed by the second processing circuit. As a result, it is possible to suppress an increase in cost required for hardware and to suppress a temporary stop due to a temporary failure.

11 Claims, 19 Drawing Sheets

(52) U.S. Cl.
CPC .......... *G06F 11/1633* (2013.01); *G06F 11/14* (2013.01); *G06F 11/16* (2013.01)

(56) References Cited

U.S. PATENT DOCUMENTS

| 2014/0181587 A1* | 6/2014 | Sridharan | G06F 11/1482 |
| | | | 714/37 |
| 2014/0189305 A1* | 7/2014 | Hickmann | G06F 11/14 |
| | | | 712/205 |
| 2014/0189319 A1* | 7/2014 | Bradford | G06F 9/3836 |
| | | | 712/221 |
| 2014/0214277 A1 | 7/2014 | Brenner | |
| 2017/0083392 A1 | 3/2017 | Lupescu | |
| 2018/0329780 A1 | 11/2018 | Boettjer et al. | |
| 2021/0141697 A1* | 5/2021 | Chin | G06F 11/1076 |

FOREIGN PATENT DOCUMENTS

| JP | 2000-298594 A | 10/2000 |
| JP | 2011-113399 A | 6/2011 |
| JP | 2019-008781 A | 1/2019 |
| WO | 2013/037524 A1 | 3/2013 |

OTHER PUBLICATIONS

International Search Report for PCT/JP2020/015668 dated for Jun. 9, 2020 [PCT/ISA/210].
Written Opinion for PCT/JP2020/015668 dated for Jun. 9, 2020 [PCT/ISA/237].
Extended European Search Report dated Jan. 29, 2024 in corresponding EP Application No. 20917839.1.

* cited by examiner

INFORMATION PROCESSING DEVICE, CONTROL METHOD, AND NON-TRANSITORY COMPUTER READABLE MEDIUM

CROSS REFERENCE TO RELATED APPLICATIONS

This application is a National Stage of International Application No. PCT/JP2020/015668 filed Apr. 7, 2020, based on and claiming priority from Japanese Patent Application No. 2020-017052 filed Feb. 4, 2020, the contents of each of which being herein incorporated by reference in their entireties.

TECHNICAL FIELD

The present disclosure relates to an information processing device, a control method, and a program.

BACKGROUND ART

An information processing device may output an arithmetic result different from a desired result due to an occurrence of temporary failure during execution of an arithmetic process. Such a temporary failure occurs due to, for example, data corruption in a register in a processor, data corruption on a bus, malfunction of the processor, or the like. When an information processing device in which a temporary failure may occur is applied to a system, the system may be temporarily stopped due to the failure. The temporary stop of the system supporting the social infrastructure exerts a serious effect. In addition, when a temporary stop occurs in a system incorporated in a production line, production efficiency decreases.

Technologies for avoiding such a temporary stop of the system have been developed. For example, Japanese Patent Laying-Open No. 2019-8781 (Patent Literature 1) discloses a triple modular redundant (TMR) technology for triplicating a processing circuit. According to the TMR technology, even if a temporary failure occurs in one of the three processing circuits, the failure can be corrected by the remaining two processing circuits. This can avoid a temporary stop of the system.

CITATION LIST

Patent Literature

PTL 1: Japanese Patent Laying-Open No. 2019-8781

SUMMARY OF INVENTION

Technical Problem

However, the technology described in Patent Literature 1 needs to prepare three identical processing circuits, and this increases the cost required for hardware constituting the processing circuits.

The present disclosure has been accomplished in view of the above problems, and an object thereof is to provide an information processing device, a control method, and a program capable of suppressing an increase in cost required for hardware and suppressing a temporary stop of a system due to a temporary failure.

Solution to Problem

According to an example of the present disclosure, an information processing device that executes an arithmetic process includes a first processing circuit and a second processing circuit. The first processing circuit executes the arithmetic process N times consecutively. The second processing circuit executes the arithmetic process N times consecutively. N is an integer of 2 or more. According to a match between at least one first result among first results of the N arithmetic processes executed by the first processing circuit and at least one second result among second results of the N arithmetic processes executed by the second processing circuit, the first processing circuit and the second processing circuit continue to operate on the basis of the at least one first result and the at least one second result.

According to this disclosure, it is possible to suppress an increase in cost required for hardware as compared with the TMR technology that requires three processing circuits.

Commonly, the probability of an occurrence of a temporary failure during the execution of the arithmetic process is low. Therefore, it is estimated that the at least one first result and the at least one second result that coincide with each other are results of arithmetic processes having no temporary failure during execution. As a result, the first and second processing circuits can continue to operate using the highly reliable result. As described above, even if a temporary failure occurs, the operation can be continued, and a temporary stop of the system due to the temporary failure can be suppressed.

In the above disclosure, the first processing circuit includes a first memory and a first processor that executes the arithmetic process using the first memory. The second processing circuit includes a second memory and a second processor that executes the arithmetic process using the second memory. The first processor executes the N arithmetic processes using N different regions of the first memory, respectively. The second processor executes the N arithmetic processes using N different regions of the second memory, respectively.

According to this disclosure, at least one first result and at least one second result match each other even if data corruption occurs due to a temporary failure before the start of the arithmetic process in a part of the N regions of the first memory and a part of the N regions of the second memory. The temporary failure that can occur before the start of the arithmetic process may occur due to, for example, a soft error. Therefore, the first processor and the second processor can continue to operate on the basis of the at least one first result and the at least one second result that match each other, respectively. That is, even when a temporary failure occurs before the start of the arithmetic process, the first processing circuit and the second processing circuit can continue to operate.

In the above disclosure, the first processor overwrites data of a region used in the arithmetic process that outputs a result different from the at least one first result among the N regions of the first memory with data of a region used in the arithmetic process that outputs the at least one first result. The second processor overwrites data of a region used in the arithmetic process that outputs a result different from the at least one second result among the N regions of the second memory with data of a region used in the arithmetic process that outputs the at least one second result.

According to this disclosure, erroneous data is restored to correct data. Thus, it is possible to prevent erroneous data from being taken over to the next arithmetic task.

In the above disclosure, the first processing circuit includes a first memory and a first processor that executes the arithmetic process using the first memory. The second processing circuit includes a second memory and a second processor that executes the arithmetic process using the second memory. When writing target data used for the arithmetic process to the first memory, the first processor also writes two pieces of copy data obtained by copying the target data to the first memory. When writing target data used for the arithmetic process to the second memory, the second processor also writes two pieces of copy data obtained by copying the target data to the second memory. The first processor reads the target data and the two pieces of copy data from the first memory before executing the arithmetic process, and according to a match between two or more pieces of data among the target data and the two pieces of copy data which have been read, executes the arithmetic process using the two or more pieces of data that match. The second processor reads the target data and the two pieces of copy data from the second memory before executing the arithmetic process, and according to a match between two or more pieces of data among the target data and the two pieces of copy data which have been read, executes the arithmetic process using the two or more pieces of data that match.

According to this disclosure, even if data corruption occurs in any one of the target data and the two pieces of copy data in each of the first memory and the second memory due to a temporary failure (for example, soft error) that occurs before the start of the arithmetic process, the arithmetic process is executed using the remaining two pieces of data. As a result, even when a temporary failure occurs before the start of the arithmetic process, the arithmetic process is executed using correct data without having the temporary failure, and the operation can be continued on the basis of the result of the arithmetic process.

In the above disclosure, according to a match between two pieces of data among the target data and the two pieces of copy data and a mismatch between remaining one piece of data and the two pieces of data, the first processor writes one of the two pieces of data over a region storing the remaining one piece of data in the first memory.

According to a match between two pieces of data among the target data and the two pieces of copy data and a mismatch between remaining one piece of data and the two pieces of data, the second processor writes one of the two pieces of data over a region storing the remaining one piece of data in the second memory.

According to this disclosure, corrupted data due to the temporary failure is restored to correct data. Thus, it is possible to prevent erroneous data from being taken over to the next arithmetic task.

In the above disclosure, the first processor writes the results of the N arithmetic processes in N different regions of the first memory, respectively. The second processor writes the results of the N arithmetic processes in N different regions of the second memory, respectively. The first processor overwrites data of a region in which a result different from the at least one first result is written among the N regions of the first memory with data of a region in which the at least one first result is written. The second processor overwrites data of a region in which a result different from the at least one second result is written among the N regions of the second memory with data of a region in which the at least one second result is written.

According to this disclosure, erroneous data is restored to correct data. Thus, it is possible to prevent erroneous data from being taken over to the next arithmetic task.

According to an example of the present disclosure, an information processing device that executes an arithmetic process includes a first processing circuit and a second processing circuit. A control method for controlling the information processing device includes: executing the arithmetic process N times consecutively by the first processing circuit; and executing the arithmetic process N times consecutively by the second processing circuit. N is an integer of 2 or more. The control method further includes, according to a match between at least one first result among first results of the N arithmetic processes executed by the first processing circuit and at least one second result among second results of the N arithmetic processes executed by the second processing circuit, continuing operation of the first processing circuit and the second processing circuit on the basis of the at least one first result and the at least one second result.

According to an example of the present disclosure, a program causes a computer to execute the above control method. According to the above disclosures, it is also possible to suppress an increase in cost required for hardware and to suppress a temporary stop due to a temporary failure.

ADVANTAGEOUS EFFECTS OF INVENTION

According to the present disclosure, it is possible to suppress an increase in cost required for hardware and to suppress a temporary stop due to a temporary failure.

DESCRIPTION OF EMBODIMENTS

Figure 1:
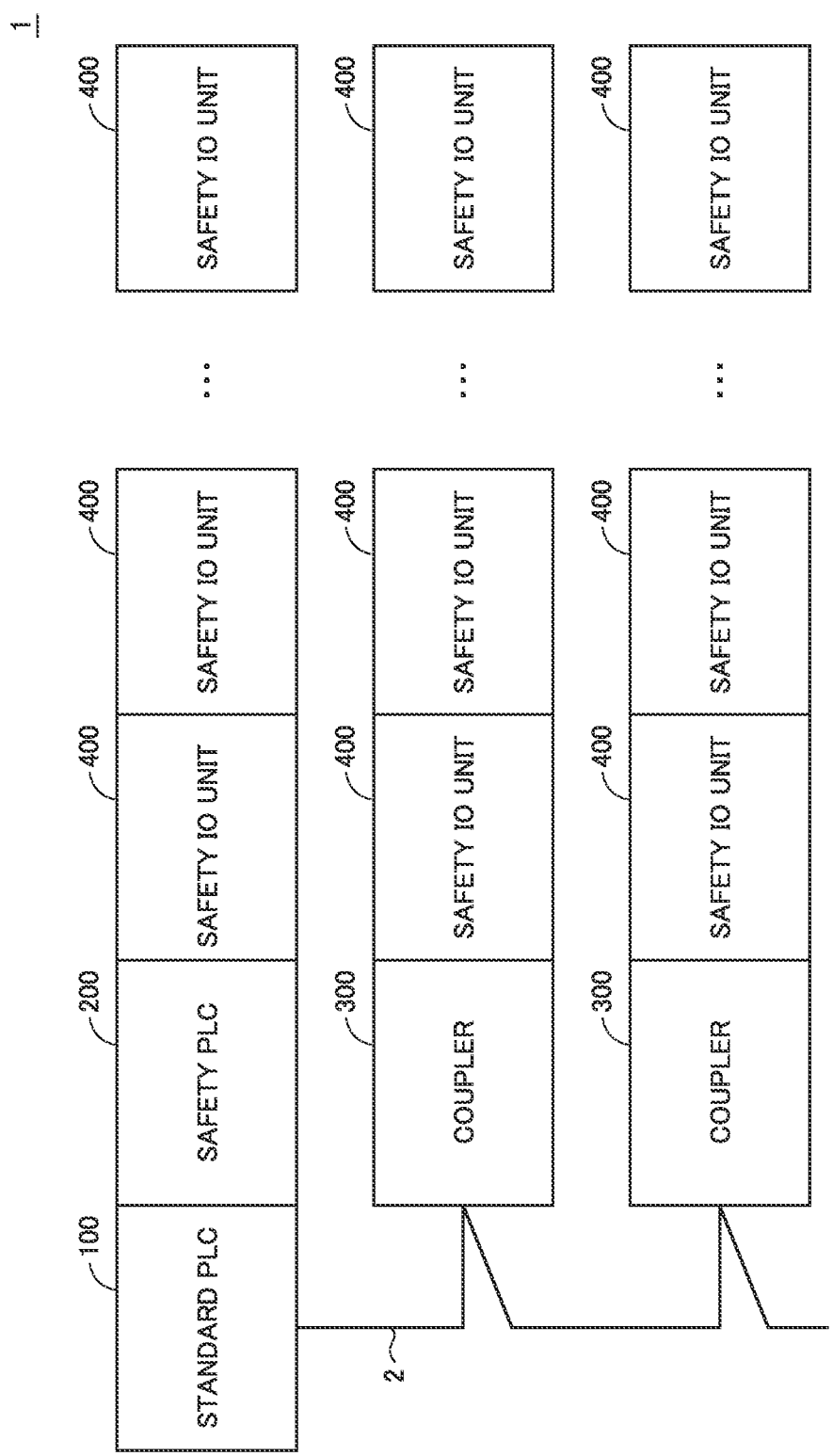
FIG. 1 is a schematic diagram illustrating an overall configuration of a control system according to an embodiment.

An embodiment of the present invention will be described in detail with reference to the drawings. The same or corresponding parts in the drawings are denoted by the same reference signs, and the description thereof will not be repeated.

§ 1 APPLICATION EXAMPLE

In various fields such as aerospace systems, automobiles, medical equipment, communication equipment, and industrial equipment, it is desirable to suppress a temporary stop of a system due to a temporary failure of an information processing device. The present invention can be applied to systems in such various fields. In the following, a control system incorporated in a factory automation (FA) field will be described as an application example of the present invention, but the application example of the present invention is not limited to the control system.

FIG. 1 is a schematic diagram illustrating an overall configuration of a control system according to the embodiment. The control system 1 illustrated in FIG. 1 includes, as main components, a standard programmable logic controller (PLC) 100, a safety PLC 200, one or more couplers 300, and one or more safety IO units 400.

Standard PLC 100 performs standard control on any control target according to a standard control program created in advance. The "standard control" is a generic term for processing for controlling the control target in accordance with a predetermined required specification. The control target is, for example, a servomotor, a robot, or the like.

Safety PLC 200 executes safety control for any control target independently of standard PLC 100. Safety PLC 200 illustrated in FIG. 1 is connected to standard PLC 100 via a local bus. The "safety control" collectively refers to processing for preventing a threat to human safety by facility, machine, or the like. The "safety control" is designed to satisfy a requirement for implementing the safety function prescribed in IEC 61508 or the like.

Coupler 300 mediates data exchange between standard PLC 100 and safety IO unit 400. Coupler 300 is electrically connected to standard PLC 100 via a field network 2. Field network 2 is a communication medium for implementing data transmission for factory automation (FA). In field network 2, frames can be transmitted at a predetermined cycle, and the data arrival time for each node in the network is guaranteed. As an example of a protocol in which the data arrival time is guaranteed, EtherCAT (registered trademark) is adopted as field network 2 in control system 1 according to the present embodiment.

Coupler 300 transmits data received from standard PLC 100 to safety IO unit 400, and when receiving data from safety IO unit 400, prepares to store the received data in the next arriving frame.

Safety IO unit 400 is connected to safety PLC 200 or coupler 300 through a local bus. Further, any safety device (not illustrated) is connected to safety IO unit 400. The safety device includes a light curtain, an emergency stop button, a safety door switch, and the like.

Safety IO unit 400 receives an input signal from the safety device and provides the input signal to safety PLC 200. Alternatively, safety IO unit 400 receives an input signal from the safety device and provides the input signal to standard PLC 100 via coupler 300. The input signal provided to standard PLC 100 is provided to safety PLC 200.

Further, safety IO unit 400 outputs an output signal to the safety device in response to a command from safety PLC 200. Alternatively, safety IO unit 400 outputs an output signal to the safety device in response to a command from safety PLC 200 via coupler 300 and standard PLC 100.

Safety IO unit 400 executes an arithmetic task pertaining to, for example, receiving an input signal from the safety device, providing the input signal, and outputting an output signal to the safety device at every predetermined cycle (hereinafter referred to as a "safety task cycle").

Safety PLC 200 executes the safety control in response to the input signal provided from safety IO unit 400. For example, when given an input signal indicating the intrusion of a person from the safety device which is a light curtain, safety PLC 200 interrupts the power supply to the control target of standard PLC 100 and temporarily stops control system 1. Alternatively, when given an input signal indicating the depression of the safety device which is an emergency stop button, safety PLC 200 interrupts the power supply to the control target of standard PLC 100 and temporarily stops control system 1.

As described above, safety IO unit 400 is directly involved in the safety control for preventing a threat to human safety. Therefore, safety PLC 200 is designed to also stop control system 1 temporarily when a failure or an abnormality occurs in safety IO unit 400.

When a temporary failure occurs during the execution of the arithmetic task by a processing circuit included in safety IO unit 400 and safety IO unit 400 continues to operate without correcting the failure, safety PLC 200 cannot normally execute the safety control. For this reason, safety IO unit 400 has a function of detecting an occurrence of a temporary failure during the execution of the arithmetic task. However, when safety IO unit 400 outputs a failure signal when detecting an occurrence of the temporary failure, control system 1 is stopped. Control system 1 can be incorporated into a production line that operates 24 hours× 365 days. If control system 1 is temporarily stopped in such a production line, extensive damage may occur.

In view of this, safety IO unit 400 which is the information processing device according to the present embodiment includes two processing circuits so as to continue a normal operation even when a temporary failure occurs in one processing circuit. In the following, one of the two processing circuits is referred to as an A-channel circuit, and the other is referred to as a B-channel circuit.

In the configuration in which three processing circuits are provided using the TMR technology described in Patent Literature 1, even when a temporary failure occurs in one of the three processing circuits, the operation can be continued using the remaining two processing circuits. However, when the TMR technology is used, the cost required for the hardware constituting the processing circuits increases. In view of this, safety IO unit 400 according to the present embodiment includes two processing circuits (A-channel circuit and B-channel circuit). This configuration can reduce the cost required for the hardware as compared with the case of designing the safety IO unit using the TMR technology.

Figure 2:
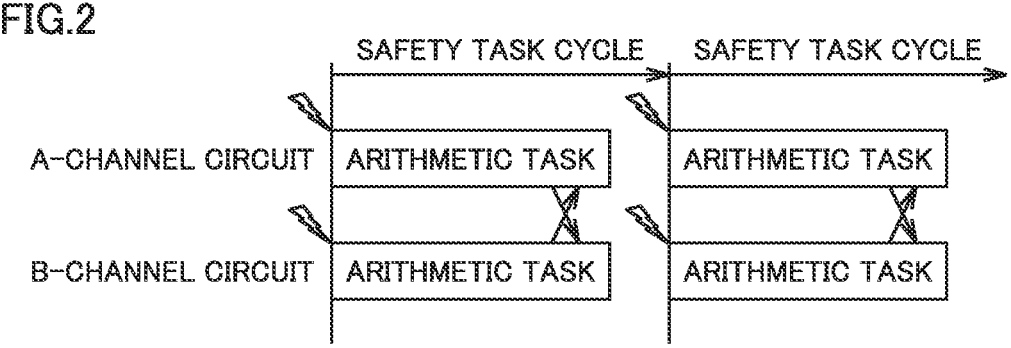
FIG. 2 is a diagram illustrating a reference example of processing using two processing circuits.

FIG. 2 is a diagram illustrating a reference example of processing using two processing circuits. In the reference example illustrated in FIG. 2, the A-channel circuit and the B-channel circuit execute the arithmetic tasks in parallel in each safety task cycle.

Temporary failures can occur accidentally with a low probability. Therefore, a temporary failure rarely occurs in both the A-channel circuit and the B-channel circuit in the same safety task cycle.

When a temporary failure does not occur in either the A-channel circuit or the B-channel circuit, the results of the arithmetic tasks coincide with each other. On the other hand, when a temporary failure occurs in at least one of the A-channel circuit and the B-channel circuit, the results of the arithmetic tasks do not match. Therefore, whether or not the temporary failure occurs can be detected by comparing the results of the arithmetic tasks of the A-channel circuit and the B-channel circuit. That is, it is possible to detect the occurrence of the temporary failure according to a mismatch between the results of the arithmetic tasks of the A-channel circuit and the B-channel circuit.

However, in the reference example illustrated in FIG. 2, it is not possible to determine which of the A-channel circuit and the B-channel circuit has a temporary failure. Therefore, the safety IO unit determines that the normal operation cannot be continued according to the mismatch between the results of the two arithmetic tasks, and only outputs a failure signal. As a result, control system 1 is stopped by the safety control of safety PLC 200. Therefore, in a case where the processing of the reference example illustrated in FIG. 2 is executed, control system 1 temporarily stops when a temporary failure occurs in one of the processing circuits.

Safety IO unit 400 according to the present embodiment executes the following processing in order to continue a normal operation even when a temporary failure occurs in one processing circuit.

Figure 3:
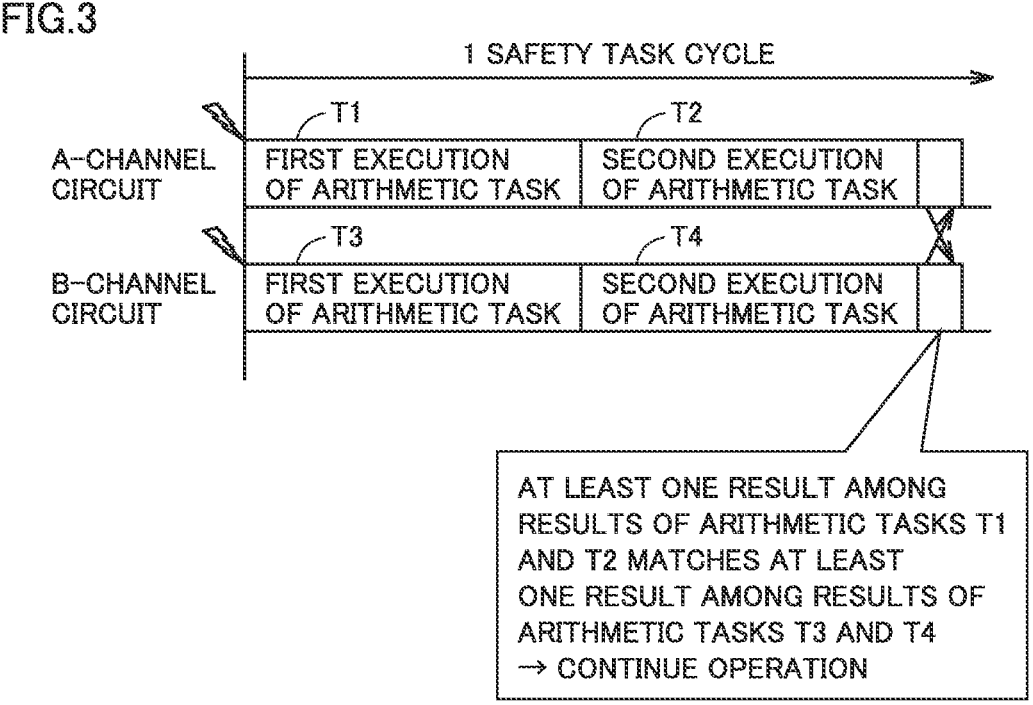
FIG. 3 is a diagram illustrating an example of processing using two processing circuits.

FIG. 3 is a diagram illustrating an example of processing using two processing circuits. As illustrated in FIG. 3, the A-channel circuit executes the same arithmetic tasks T1 and T2 consecutively in the safety task cycle. The B-channel circuit executes the same arithmetic tasks T3 and T4 consecutively in the safety task cycle. In addition, arithmetic tasks T1 and T2 executed by the A-channel circuit are the same as arithmetic tasks T3 and T4 executed by the B-channel circuit. That is, safety IO unit 400 executes same arithmetic tasks T1 to T4 in the safety task cycle. Then, safety IO unit 400 compares the results of arithmetic tasks T1 to T4 for each safety task cycle, and detects whether or not a temporary failure occurs based on the comparison result.

When the temporary failure does not occur in all arithmetic tasks T1 to T4, the results of arithmetic tasks T1 to T4 are the same. Therefore, safety IO unit 400 determines that the temporary failure does not occur in any of arithmetic tasks T1 to T4 according to the results of arithmetic tasks T1 to T4 being the same, and may continue the operation based on any one of the arithmetic results.

The result of the arithmetic task having a temporary failure during execution is commonly different from the result of the arithmetic task without having the temporary failure during execution. In addition, the result of the arithmetic task having a temporary failure during execution commonly varies depending on the content of the temporary failure. It is extremely rare that temporary failures having the same content occur in both the A-channel circuit and the B-channel circuit in one safety task cycle.

In view of this, according to a match between at least one first result among the results (first results) of arithmetic tasks T1 and T2 and at least one second result among the results (second results) of arithmetic tasks T3 and T4, the A-channel circuit and the B-channel circuit in safety IO unit 400 according to the present embodiment continue to operate on the basis of the matching results. That is, the A-channel circuit continues to operate on the basis of the at least one first result among the results of arithmetic tasks T1 and T2. The B-channel circuit continues to operate on the basis of the at least one second result among the results of arithmetic tasks T3 and T4. Thus, it is possible to suppress an increase in cost required for hardware and to suppress a temporary stop of the system due to the temporary failure.

§ 2 FIRST SPECIFIC EXAMPLE

<Hardware Configuration of Standard PLC>

Figure 4:
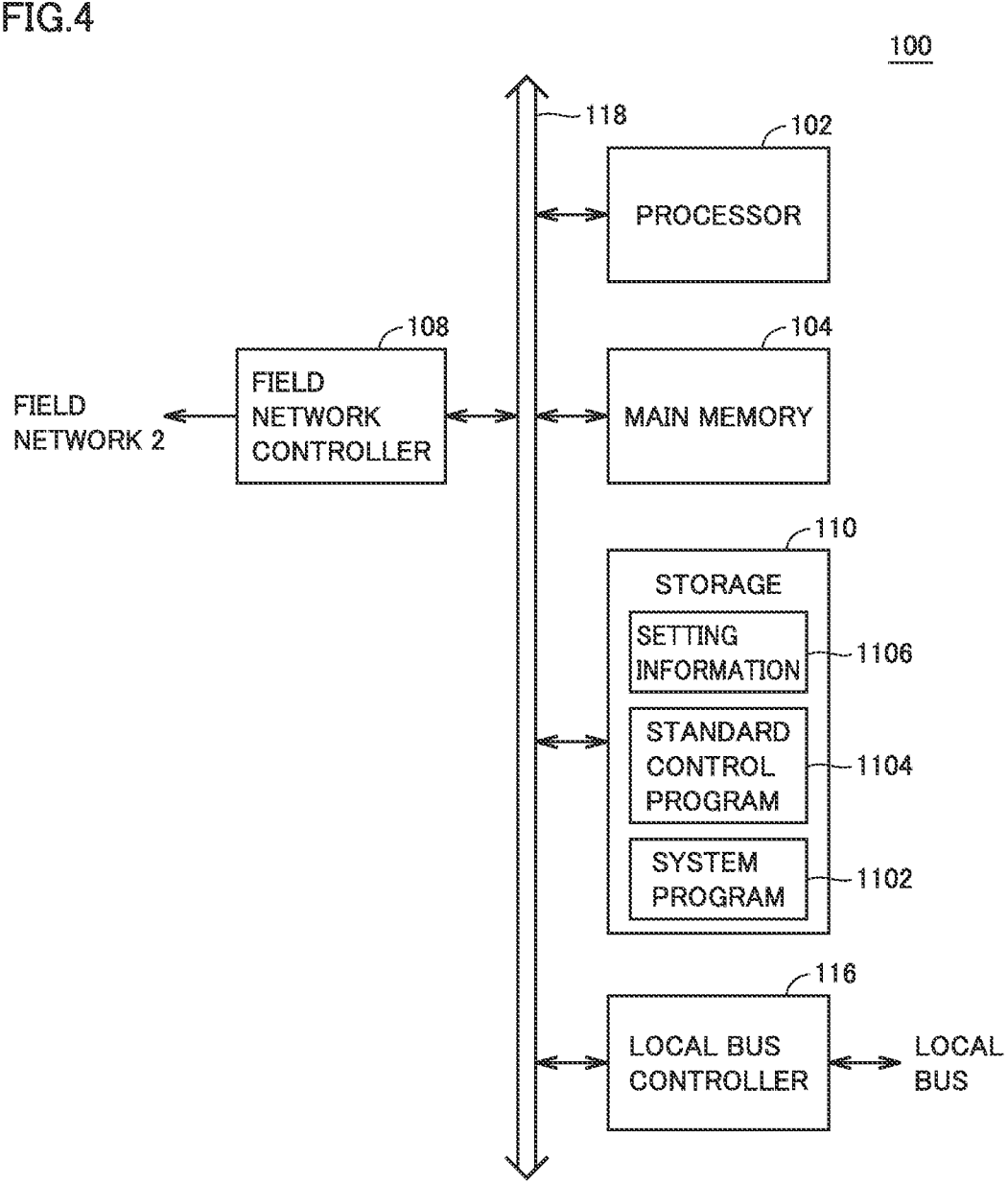
FIG. 4 is a schematic diagram illustrating a hardware configuration example of a standard PLC.

FIG. 4 is a schematic diagram illustrating a hardware configuration example of the standard PLC. Standard PLC 100 illustrated in FIG. 4 includes a processor 102, a main memory 104, a storage 110, a field network controller 108, and a local bus controller 116. These components are connected via a processor bus 118.

Processor 102 mainly corresponds to an arithmetic processing unit that executes a control calculation related to standard control, and includes a central processing unit (CPU), a graphics processing unit (GPU), and the like. Specifically, processor 102 reads a program (a system program 1102 and a standard control program 1104 as an example) stored in storage 110, develops the program in main memory 104, and executes the program, thereby implementing a control calculation according to a control target and various kinds of processing as described later.

Main memory 104 includes a volatile memory such as a dynamic random access memory (DRAM) or a static random access memory (SRAM). Storage 110 includes, for example, a non-volatile storage device such as a solid state drive (SSD) or a hard disk drive (HDD).

Storage 110 stores system program 1102 for achieving basic functions, standard control program 1104 created according to a control target, and setting information 1106 for defining processing in standard PLC 100.

Field network controller 108 exchanges data with any device (coupler 300, for example) via field network 2.

Local bus controller 116 exchanges data with any unit (safety PLC 200, for example) connected to standard PLC 100 via the local bus.

<Hardware Configuration of Safety PLC>

Figure 5:
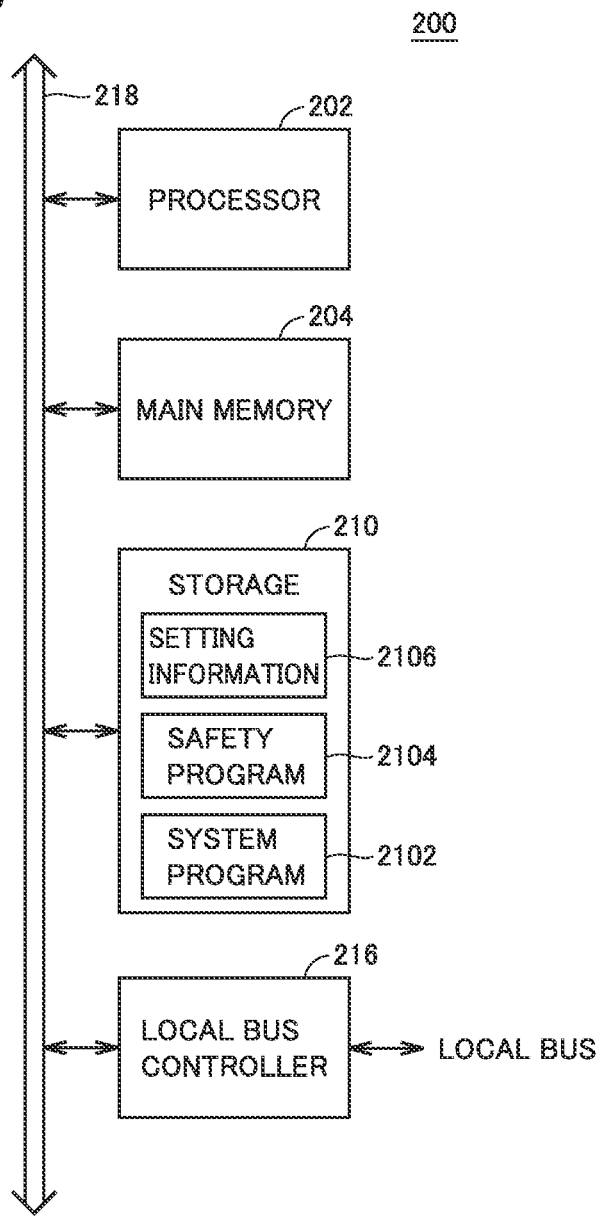
FIG. 5 is a schematic diagram illustrating a hardware configuration example of a safety PLC.

FIG. 5 is a schematic diagram illustrating a hardware configuration example of safety PLC. Safety PLC 200 illustrated in FIG. 5 includes a processor 202, a main memory 204, a storage 210, and a local bus controller 216. These components are connected via a processor bus 218.

Processor 202 mainly corresponds to an arithmetic processing unit that executes a control calculation related to the safety control, and includes a CPU, a GPU, and the like.

Main memory 204 includes a volatile memory such as a DRAM or a SRAM. Storage 210 includes, for example, a non-volatile storage device such as an SSD or an HDD.

Storage 210 stores a system program 2102 for achieving basic functions, a safety program 2104 created according to a required safety function, and setting information 2106 for defining processing in safety PLC 200.

Local bus controller 216 exchanges data with safety IO unit 400 connected to safety PLC 200 via the local bus.

<Hardware Configuration of Coupler>

Figure 6:
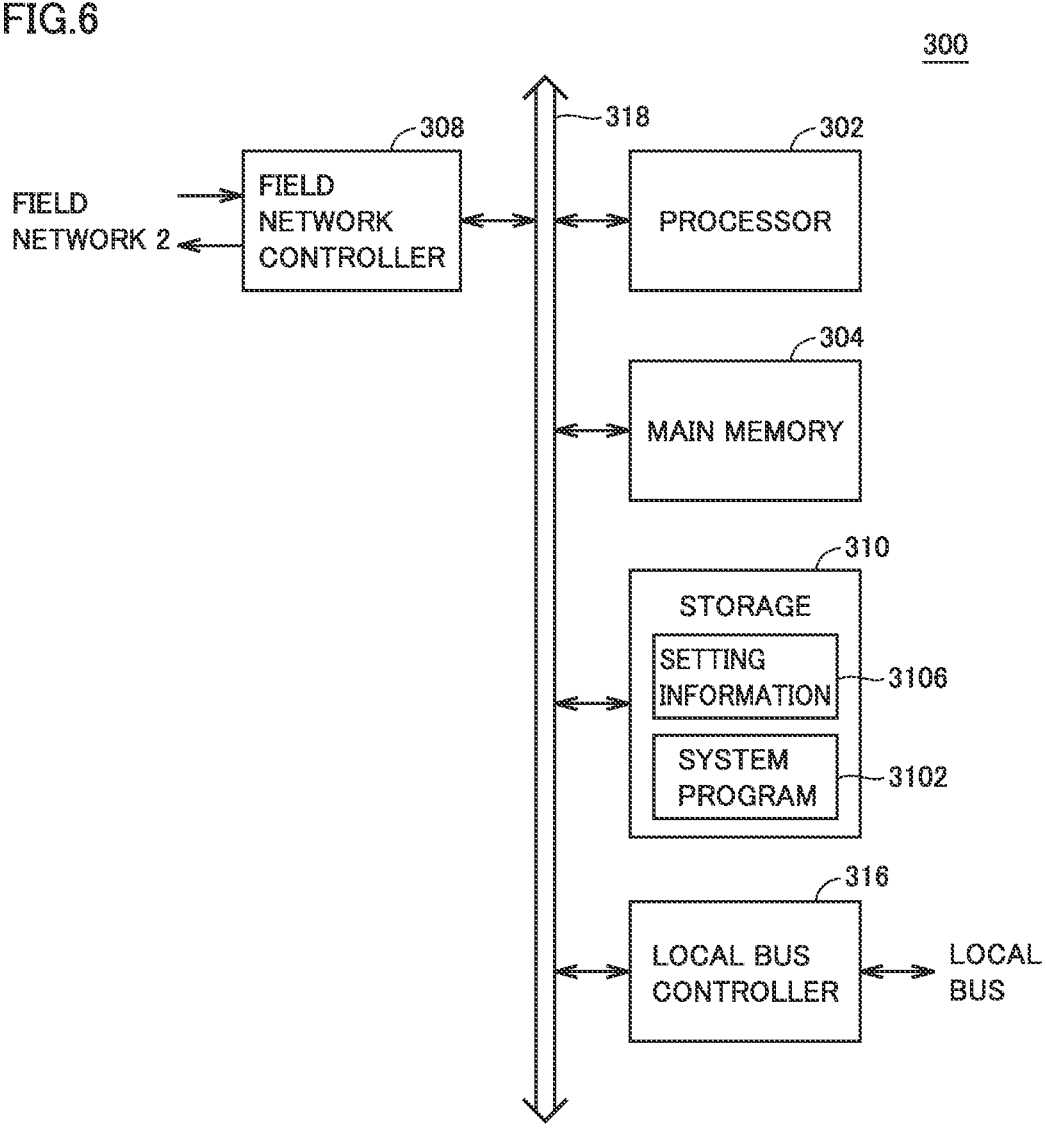
FIG. 6 is a schematic diagram illustrating a hardware configuration example of a coupler.

FIG. 6 is a schematic diagram illustrating a hardware configuration example of the coupler. Coupler 300 illustrated in FIG. 6 includes a processor 302, a main memory 304, a storage 310, a field network controller 308, and a local bus controller 316. These components are connected via a processor bus 318.

Processor 302 mainly corresponds to an arithmetic processing unit that executes a control calculation for operating coupler 300, and includes a CPU, a GPU, and the like.

Main memory 304 includes a volatile memory such as a DRAM or a SRAM. Storage 310 includes, for example, a non-volatile storage device such as an HDD or an SSD.

Storage 310 stores a system program 3102 for achieving basic functions and setting information 3106 for defining processing in coupler 300.

Field network controller 308 exchanges data with any device (standard PLC 100, for example) via field network 2.

Local bus controller 316 exchanges data with safety IO unit 400 connected to coupler 300 via the local bus.

<Hardware Configuration of Safety IO Unit>

Figure 7:
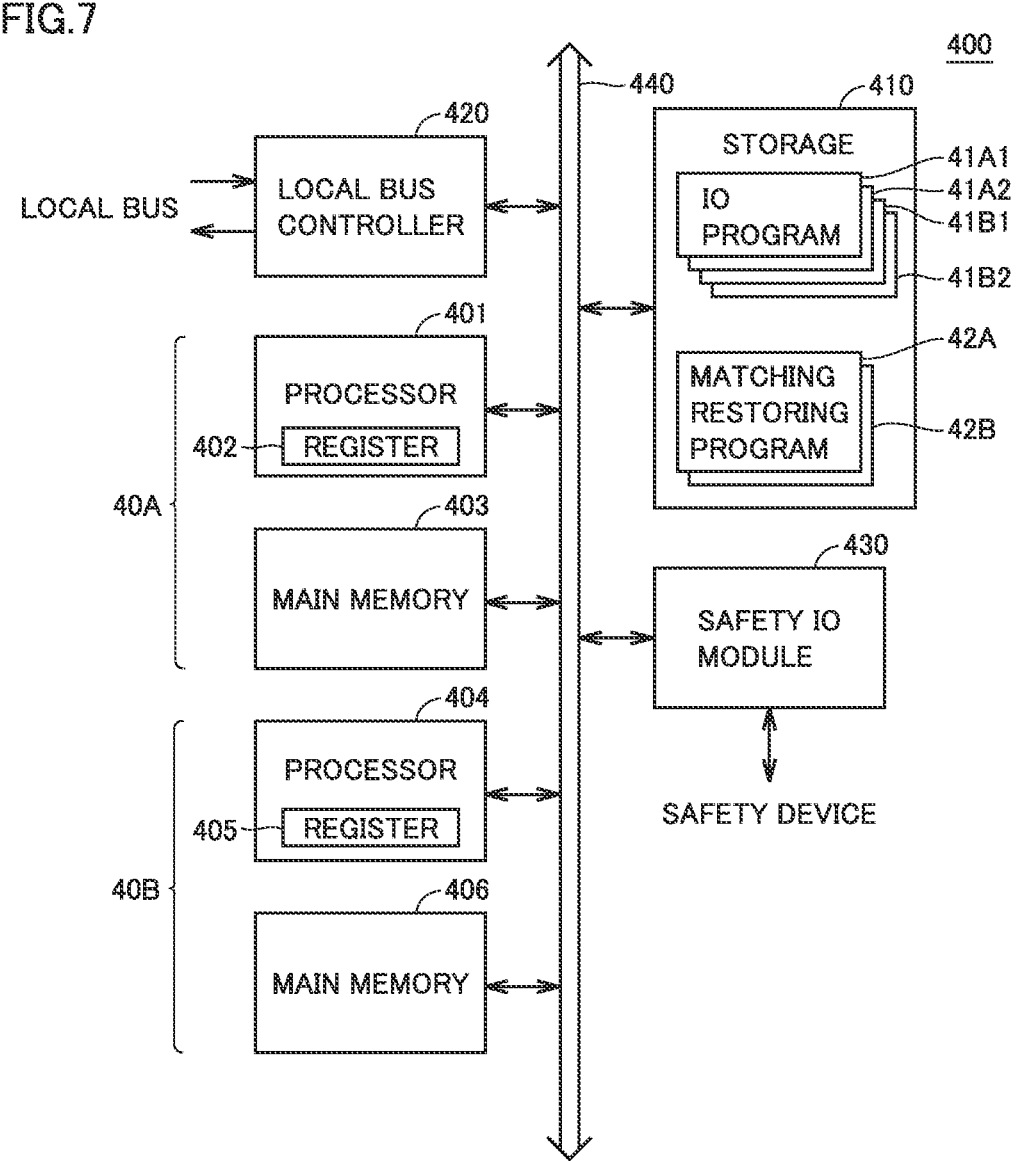
FIG. 7 is a schematic diagram illustrating a hardware configuration example of a safety IO unit according to a first specific example.

FIG. 7 is a schematic diagram illustrating a hardware configuration example of the safety IO unit according to the first specific example. Safety IO unit 400 illustrated in FIG. 7 includes two processing circuits, a storage 410, a local bus controller 420, and a safety IO module 430. These components are connected via a processor bus 440.

An A-channel circuit 40A which is one of the two processing circuits includes a processor 401 and a main memory 403. A B-channel circuit 40B which is the other of the two processing circuits includes a processor 404 and a main memory 406.

Processors 401 and 404 correspond to an arithmetic processing unit that executes a control calculation related to input/output of a signal necessary for achieving the safety control and a management function, and includes a CPU, a micro processing unit (MPU), and the like. Processors 401 and 404 respectively incorporate registers 402 and 405. Registers 402 and 405 temporarily hold arithmetic results by processors 401 and 404, and hold addresses when reading and writing main memories 403 and 406.

Each of main memories 403 and 406 includes a volatile memory such as a DRAM or a SRAM. The SRAM uses a flip-flop as a structure of a storage unit, and has an advantage of being operated at a higher speed than the DRAM without requiring a refresh operation. Therefore, the SRAM is preferably used as each of main memories 403 and 406. In the following, it is assumed that the SRAM is used for each of main memories 403 and 406.

Storage 410 includes, for example, a non-volatile storage device such as an SSD or an HDD. Storage 410 stores IO programs 41A1, 41A2, 41B1, and 41B2 for achieving an IO function, and matching restoring programs 42A and 42B. IO programs 41A1 and 41A2 and matching restoring program 42A are executed in A-channel circuit 40A. IO programs 41B1 and 41B2 and matching restoring program 42B are executed in B-channel circuit 40B.

Local bus controller 420 exchanges data with a device (safety PLC 200, coupler 300, for example) to which safety IO unit 400 is connected via the local bus.

Safety IO module 430 is electrically connected to the safety device, receives an input such as a detection result by the safety device, and outputs a signal to the safety device.

Note that, in the example of FIG. 7, storage 410 shared by A-channel circuit 40A and B-channel circuit 40B is provided. However, a storage may be provided in each of A-channel circuit 40A and B-channel circuit 40B. In addition, A-channel circuit 40A and B-channel circuit 40B may be connected using serial communication instead of processor bus 440.

<Temporary Failure>

The temporary failure may occur due to, for example, data corruption in register 402 or 405 in processor 401 or 404, data corruption on processor bus 440, malfunction of processor 401 or 404, or the like.

Furthermore, in recent years, soft errors due to a particles and cosmic ray neutrons have rapidly increased with high integration and miniaturization of semiconductor devices. The temporary failure can also be generated by data corruption due to a soft error. A DRAM having a stacked structure has high soft error resistance. On the other hand, a SRAM having a flip-flop structure has reduced soft error resistance due to miniaturization. Therefore, when main memories 403 and 406 constituted by SRAMs are used, a soft error may occur in main memory 403 or 406.

In a case where a temporary failure due to a soft error or the like occurs in main memory 403, 406 before the start of the arithmetic process (arithmetic task), processor 401, 404 performs calculation using data having the temporary failure, so that an arithmetic result is different from a desired result. Therefore, the operation of safety IO module 430 is abnormal.

Safety IO unit 400 according to the first specific example executes the following processing so as to continue the normal operation not only when the temporary failure occurs during the execution of the arithmetic process but also when the temporary failure occurs in main memory 403 or 406 before the start of the arithmetic process.

<Processing in Safety IO Unit in First Specific Example>

Figure 8:
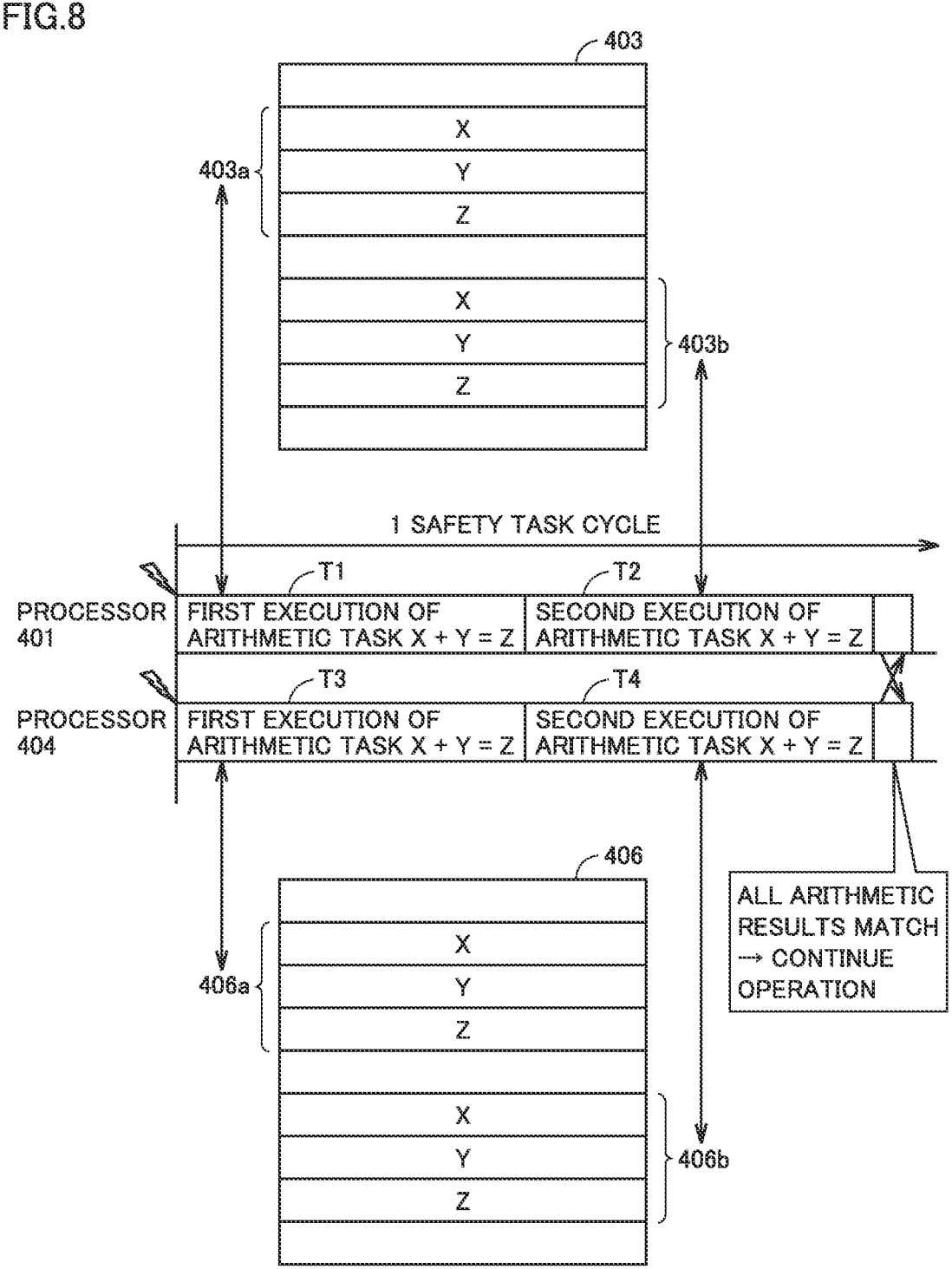
FIG. 8 is a diagram illustrating processing using two processing circuits when a temporary failure does not occur in the first specific example.
Figure 9:
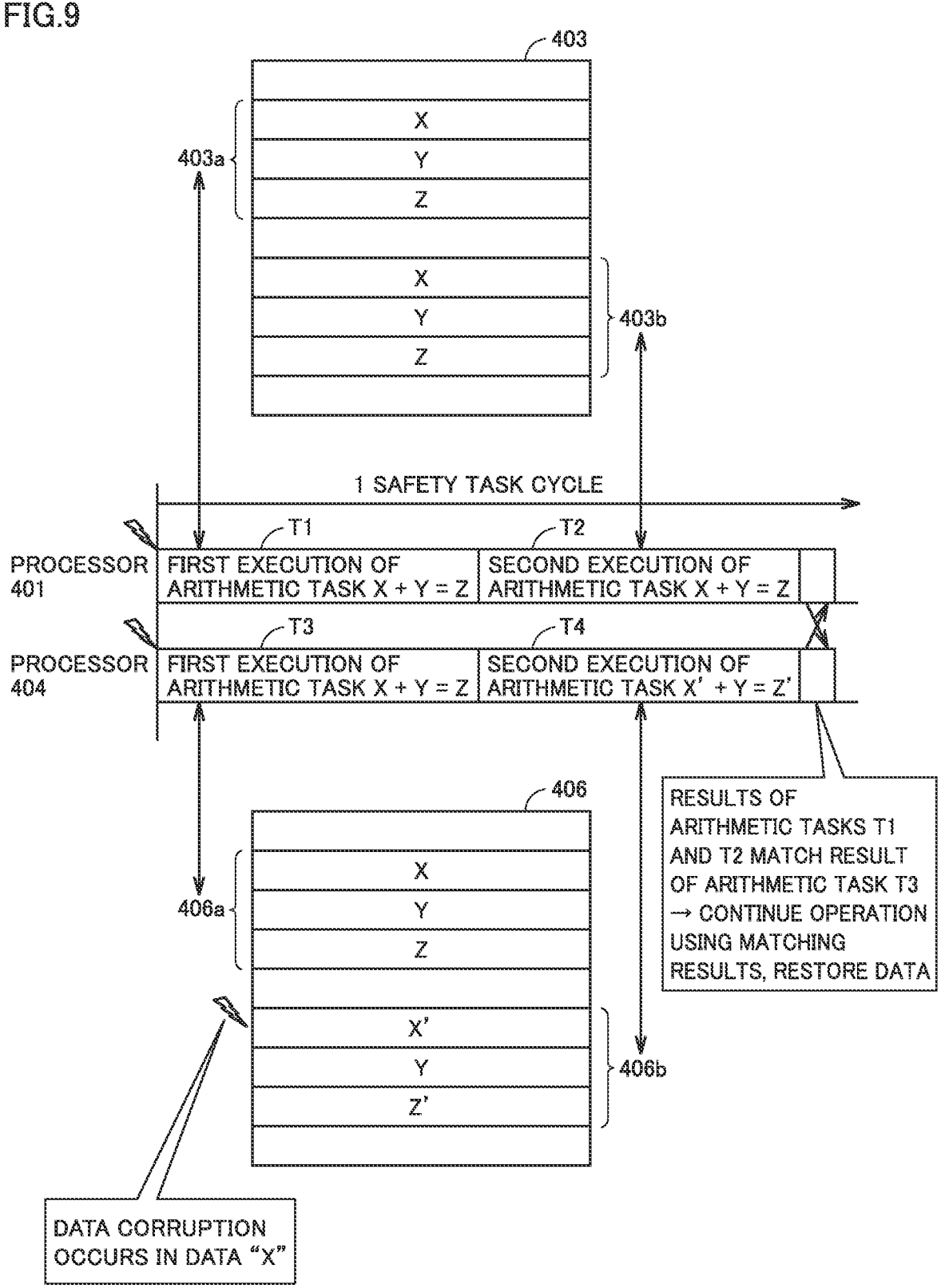
FIG. 9 is a diagram illustrating processing using two processing circuits when a temporary failure occurs in the first specific example.
Figure 10:
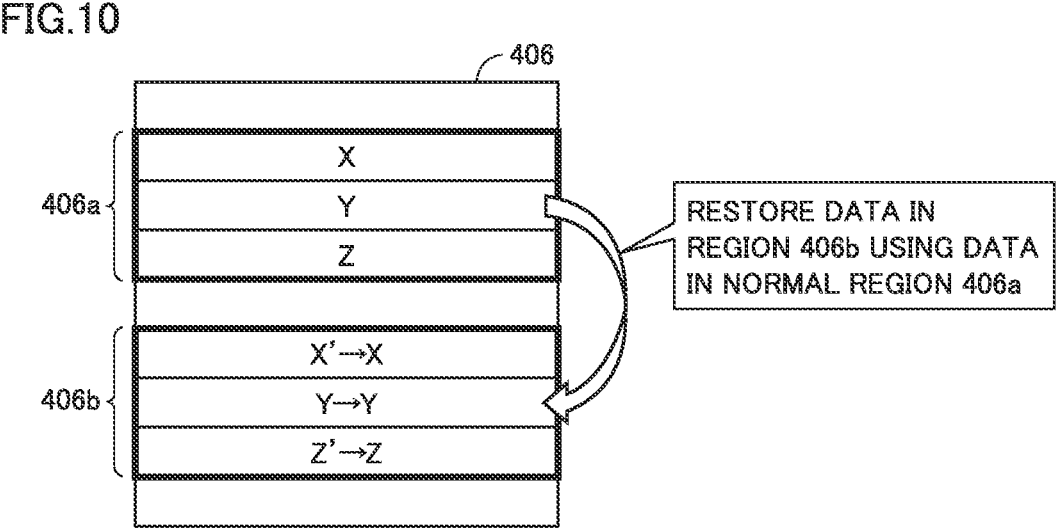
FIG. 10 is a diagram illustrating an example of data restoring processing in the first specific example.

A specific example of processing using two processing circuits will be described with reference to FIGS. 8 to 10. FIG. 8 is a diagram illustrating processing using two processing circuits when a temporary failure does not occur in the first specific example. FIG. 9 is a diagram illustrating processing using two processing circuits when a temporary failure occurs in the first specific example. FIG. 10 is a diagram illustrating an example of data restoring processing in the first specific example.

As illustrated in FIGS. 8 and 9, processor 401 in A-channel circuit 40A executes same arithmetic tasks T1 and T2 consecutively in the safety task cycle. Processor 404 in B-channel circuit 40B executes same arithmetic tasks T3 and T4 consecutively in the safety task cycle. In addition, arithmetic tasks T1 and T2 executed by processor 401 are the same as arithmetic tasks T3 and T4 executed by processor 404. That is, safety IO unit 400 executes same arithmetic tasks T1 to T4 in the safety task cycle. It is to be noted that safety IO unit 400 executes arithmetic tasks T1 to T4 using four memory regions different from each other.

Specifically, a region 403a used for first arithmetic task T1 and a region 403b used for second arithmetic task T2 are set in main memory 403 constituting A-channel circuit 40A. Similarly, a region 406a used for first arithmetic task T3 and a region 406b used for second arithmetic task T4 are set in main memory 406 constituting B-channel circuit 40B.

Processor 401 constituting A-channel circuit 40A writes data used in arithmetic task T1 into region 403a of main memory 403 constituting the A-channel circuit before executing arithmetic task T1. In the example illustrated in FIGS. 8 and 9, processor 401 writes data "X" and "Y" in region 403a before executing arithmetic task T1. Similarly, processor 401 writes data "X" and "Y" used in arithmetic task T2 in region 403*b* of main memory 403 before executing arithmetic task T2.

As in processor 401, processor 404 constituting B-channel circuit 40B writes data "X" and "Y" used in arithmetic task T3 into region 406*a* of main memory 406 constituting the B-channel circuit before executing arithmetic task T3. Similarly, processor 404 writes data "X" and "Y" used in arithmetic task T4 to region 406*b* of main memory 406 before executing arithmetic task T4.

Timings at which data "X" and "Y" are written to regions 403*a*, 403*b*, 406*a*, and 406*b* are defined by IO programs 41A1, 41A2, 41B1, and 41B2, respectively. The timings may be, for example, the previous safety task cycle or may be the startup of safety IO unit 400. Further, addresses in regions 403*a*, 403*b*, 406*a*, and 406*b* in which data "X" and "Y" are written are defined by IO programs 41A1, 41A2, 41B1, and 41B2, respectively.

Processor 401 starts arithmetic task T1 in synchronization with the start timing of the safety task cycle. In the example illustrated in FIGS. 8 and 9, processor 401 reads data "X" and "Y" from region 403*a* of main memory 403, and executes a calculation using data "X" and "Y". Then, processor 401 writes data "Z" which is the arithmetic result in region 403*a* of main memory 403.

Processor 401 starts arithmetic task T2 after the end of arithmetic task T1. Arithmetic task T2 is different from arithmetic task T1 only in using region 403*b* instead of region 403*a* in main memory 403. That is, processor 401 reads data "X" and "Y" from region 403*b*, and executes a calculation using data "X" and "Y". Then, processor 401 writes data "Z" which is the arithmetic result in region 403*b*.

Similarly, processor 404 starts arithmetic task T3 in synchronization with the start timing of the safety task cycle. Arithmetic task T3 is different from arithmetic task T1 only in using region 406*a* of main memory 406 instead of region 403*a* in main memory 403. That is, processor 404 reads data "X" and "Y" from region 406*a* of main memory 406, and executes a calculation using data "X" and "Y". Then, processor 404 writes data "Z" which is the arithmetic result in region 406*a* of main memory 406.

Processor 404 starts arithmetic task T4 after the end of arithmetic task T3. Arithmetic task T4 is different from arithmetic task T3 only in using region 406*b* instead of region 406*a* in main memory 406. That is, processor 404 reads data "X" and "Y" from region 406*b*, and executes a calculation using data "X" and "Y". Then, processor 404 writes data "Z" which is the arithmetic result in region 406*b*.

Arithmetic tasks T1 to T4 are executed according to IO programs 41A1, 41A2, 41B1, and 41B2, respectively. That is, addresses in regions 403*a*, 403*b*, 406*a*, and 406*b* from which data "X" and "Y" are read are defined by IO programs 41A1, 41A2, 41B1, and 41B2, respectively. IO programs 41A1, 41A2, 41B1, and 41B2 define the same calculation content using data "X" and "Y". Addresses in regions 403*a*, 403*b*, 406*a*, and 406*b* in which data "Z" is to be written are defined by IO programs 41A1, 41A2, 41B1, and 41B2, respectively. As described above, IO programs 41A1, 41A2, 41B1, and 41B2 are different from each other only in the addresses of the memory regions from which data is to be read and to which the data is to be written, and define the same calculation content.

In a case where neither A-channel circuit 40A nor B-channel circuit 40B has a temporary failure, the results (data "Z") of arithmetic tasks T1 to T4 are all the same as illustrated in FIG. 8. On the other hand, when a temporary failure occurs before the start or during the execution of arithmetic task T4, the result (data "Z") of arithmetic task T4 is different from the results (data "Z") of arithmetic tasks T1 to T3 as illustrated in FIG. 9. In the example of FIG. 9, before the start of arithmetic task T4, data corruption due to a soft error or the like occurs in region 406*b*, and data "X" is changed to data "X'".

Therefore, processors 401 and 404 compare the results of arithmetic tasks T1 to T4 after the two arithmetic tasks. Processors 401 and 404 determine that the temporary failure including data corruption does not occur according to a match among all results of arithmetic tasks T1 to T4, and continue to operate on the basis of the results of arithmetic tasks T1 to T4.

Processors 401 and 404 determine that, according to a match between at least one of the results of arithmetic tasks T1 and T2 and at least one of the results of arithmetic tasks T3 and T4, the matching results (hereinafter referred to as "common results") are results of the arithmetic tasks having no temporary failure. Then, the processors 401 and 404 continue to operate on the basis of the results. In the example illustrated in FIG. 9, the results of arithmetic tasks T1 and T2 match the result of arithmetic task T3. Therefore, processor 401 continues to operate on the basis of the results of arithmetic tasks T1 and T2, and processor 404 continues to operate on the basis of the result of arithmetic task T3.

Further, processors 401 and 404 write the data of the memory region used in the arithmetic task in which the common result is calculated over the memory region used in the arithmetic task in which a result different from the common result is calculated. In the example illustrated in FIG. 10, processor 404 writes the data of region 406*a* used in arithmetic task T3 which outputs the result matching the results of arithmetic tasks T1 and T2 over region 406*b* used in arithmetic task T4 which outputs the result different from the result of arithmetic task T3. As a result, erroneous data in the memory region having the temporary failure is restored to correct data in the memory region having no temporary failure. Thus, it is possible to prevent erroneous data from being taken over to the next arithmetic task.

The processes of matching arithmetic tasks T1 to T4 by processors 401 and 404 are defined by matching restoring programs 42A and 42B, respectively. In addition, the process of restoring regions 403*a* and 403*b* by processor 401 is defined by matching restoring program 42A. Similarly, the process of restoring regions 406*a* and 406*b* by processor 404 is defined by matching restoring program 42B.

<Flow of Processing in Safety IO Unit>

Figure 11:
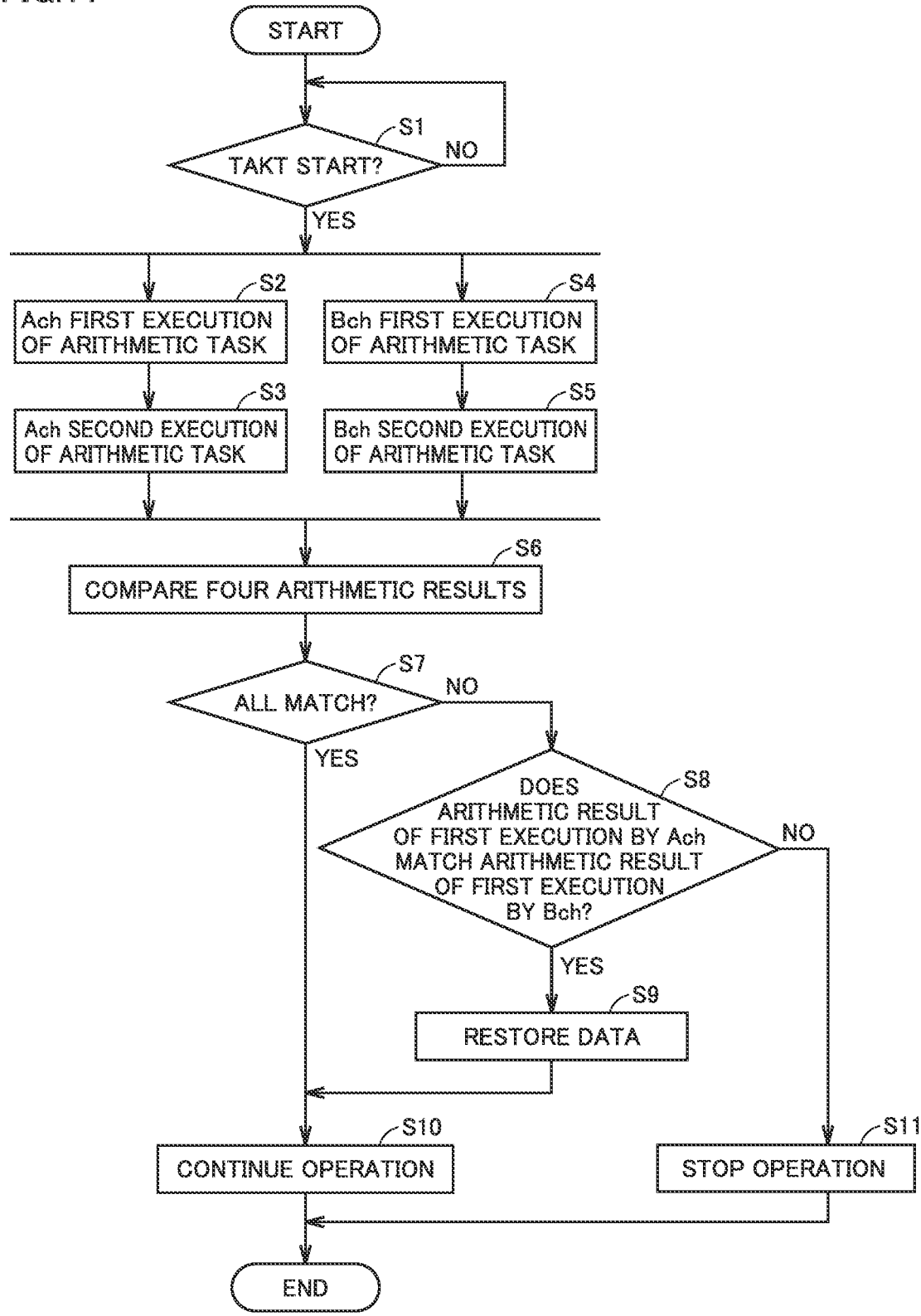
FIG. 11 is a flowchart illustrating a flow of processing in the safety IO unit.

FIG. 11 is a flowchart illustrating a flow of processing in the safety IO unit. First, processors 401 and 404 determine whether or not a takt start timing has come (step S1). When the takt start timing has not come (NO in step S1), the processing returns to step S1 again.

When the takt start timing has come (YES in step S1), parallel processing of steps S2 and S3 and steps S4 and S5 is executed. In step S2, processor 401 of A-channel circuit 40A executes first arithmetic task T1 using region 403*a* of main memory 403. When completing the execution of arithmetic task T1, processor 401 executes second arithmetic task T2 using region 403*b* of main memory 403 in step S3.

In step S4, processor 404 of B-channel circuit 40B executes first arithmetic task T3 using region 406*a* of main memory 406. When completing the execution of arithmetic task T3, processor 404 executes second arithmetic task T4 using region 406*b* of main memory 406 in step S4.

When completing the processes of steps S3 and S5, processors 401 and 404 compare the results of arithmetic tasks T1 to T4 in step S6.

When all the results of arithmetic tasks T1 to T4 match (YES in step S7), processors 401 and 404 determine that all arithmetic tasks T1 to T4 have been normally completed, and continue to operate on the basis of the results of arithmetic tasks T1 to p T4 (step S10). After step S10, the processing ends.

When all the results of arithmetic tasks T1 to T4 do not match (NO in step S7), processors 401 and 404 determine whether or not at least one of the results of arithmetic tasks T1 and T2 matches at least one of the results of arithmetic tasks T3 and T4 (step S8).

When the determination in step S8 is YES, the data of the memory region used for the arithmetic task that does not match is restored (step S9). After the data is restored, the processing proceeds to step S10.

For example, when the result of arithmetic task T1 is different from the results of the other three arithmetic tasks, processor 401 writes the data in region 403b over region 403a in main memory 403. When the result of arithmetic task T2 is different from the results of the other three arithmetic tasks, processor 401 writes the data in region 403a over region 403b in main memory 403. When the result of arithmetic task T3 is different from the results of the other three arithmetic tasks, processor 404 writes the data in region 406b over region 406a in main memory 406. When the result of arithmetic task T4 is different from the results of the other three arithmetic tasks, processor 404 writes the data in region 406a over region 406b in main memory 406.

When the results of arithmetic tasks T1 and T3 match each other and the result of each of arithmetic tasks T2 and T4 does not match the results of arithmetic tasks T1 and T3, processor 401 writes the data in region 403a over region 403b in main memory 403. Further, processor 404 writes the data in region 406a over region 406b in main memory 406. When the results of arithmetic tasks T1 and T4 match each other and the result of each of arithmetic tasks T2 and T3 does not match the results of arithmetic tasks T1 and T4, processor 401 writes the data in region 403a over region 403b in main memory 403. Further, processor 404 writes the data in region 406b over region 406a in main memory 406. When the results of arithmetic tasks T2 and T3 match each other and the result of each of arithmetic tasks T1 and T4 does not match the results of arithmetic tasks T2 and T3, processor 401 writes the data in region 403b over region 403a in main memory 403. Further, processor 404 writes the data in region 406a over region 406b in main memory 406. When the results of arithmetic tasks T2 and T4 match each other and the result of each of arithmetic tasks T1 and T3 does not match the results of arithmetic tasks T2 and T4, processor 401 writes the data in region 403b over region 403a in main memory 403. Further, processor 404 writes the data in region 406b over region 406a in main memory 406.

If the determination in step S8 is NO, processors 401 and 404 output an abnormality signal to stop the operation (step S11). After step S11, the processing ends.

<Operation and Effect>

As described above, according to the first specific example, A-channel circuit 40A includes main memory 403 and processor 401 that executes an arithmetic task using main memory 403. B-channel circuit 40B includes main memory 406 and processor 404 that executes the arithmetic task using main memory 406. Processor 401 executes arithmetic tasks T1 and T2 using two different regions 403a and 403b of main memory 403. Processor 404 executes arithmetic tasks T3 and T4 using two different regions 406a and 406b of main memory 406.

According to the above configuration, processor 401 executes two arithmetic tasks T1 and T2 using different regions 403a and 403b of main memory 403, respectively. Similarly, processor 404 executes two arithmetic tasks T3 and T4 using different regions 406a and 406b of main memory 406, respectively. As a result, even if data corruption due to a soft error or the like occurs in one of regions 403a and 403b and/or one of regions 406a and 406b, the result (common result) of the arithmetic task using the other of regions 403a and 403b and the result (common result) of the arithmetic task using the other of regions 406a and 406b coincide with each other. Therefore, processors 401 and 404 can continue to operate on the basis of the common result. That is, even when a temporary failure occurs in main memory 403 before the start of the arithmetic task, A-channel circuit 40A and B-channel circuit 40B can continue to operate.

Processor 401 overwrites the data of the region used in the arithmetic task that outputs a result different from the common result among regions 403a and 403b of main memory 403 with the data of the region used in the arithmetic task that outputs the common result. Similarly, processor 404 overwrites the data of the region used in the arithmetic task that outputs a result different from the common result among regions 406a and 406b of main memory 406 with the data of the region used in the arithmetic task that outputs the common result.

According to the above configuration, erroneous data is restored to correct data. Thus, it is possible to prevent erroneous data from being taken over to the next arithmetic task.

§ 3 SECOND SPECIFIC EXAMPLE

The data stored in the main memory includes data indicating a value and data indicating an address in the main memory. In a case where a temporary failure (for example, data corruption due to a soft error) occurs in a region where data indicating a value is stored, the value is changed from an original state. Even in this case, the processor can continue the calculation. On the other hand, when a temporary failure occurs in the region where the data indicating an address is stored, the address is changed from the original state. The changed address may not be present in the main memory. In this case, the processor determines that there is an exception (abnormality) and stops the processing.

Figure 12:
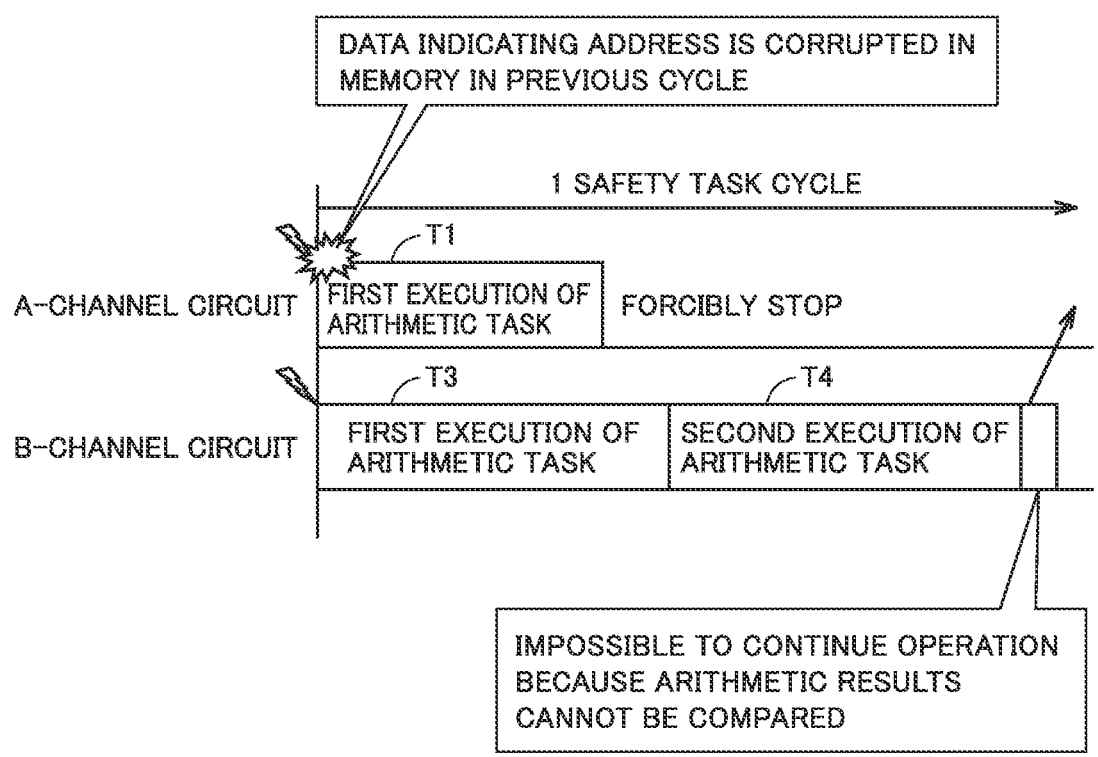
FIG. 12 is a diagram illustrating an example of processing when data indicating an address is corrupted in the first specific example.

FIG. 12 is a diagram illustrating an example of processing when data indicating an address is corrupted in the first specific example. In the example illustrated in FIG. 12, data indicating an address stored in region 403a of main memory 403 constituting A-channel circuit 40A is corrupted to indicate an address that is not present in main memory 403. Therefore, when executing arithmetic task T1, processor 401 forcibly terminates the processing in response to the data read from region 403a indicating the address that is not present in main memory 403. Therefore, the results of arithmetic tasks T1 and T2 cannot be obtained. As a result, the processing for matching arithmetic tasks T1 to T4 is not executed, and the operation of safety IO unit 400 is not continued.

Safety IO unit 400 according to the second specific example is designed so that the operation can be continued even when a temporary failure occurs in the region where the data indicating an address is stored.

<Hardware Configuration in Safety IO Unit>

Figure 13:
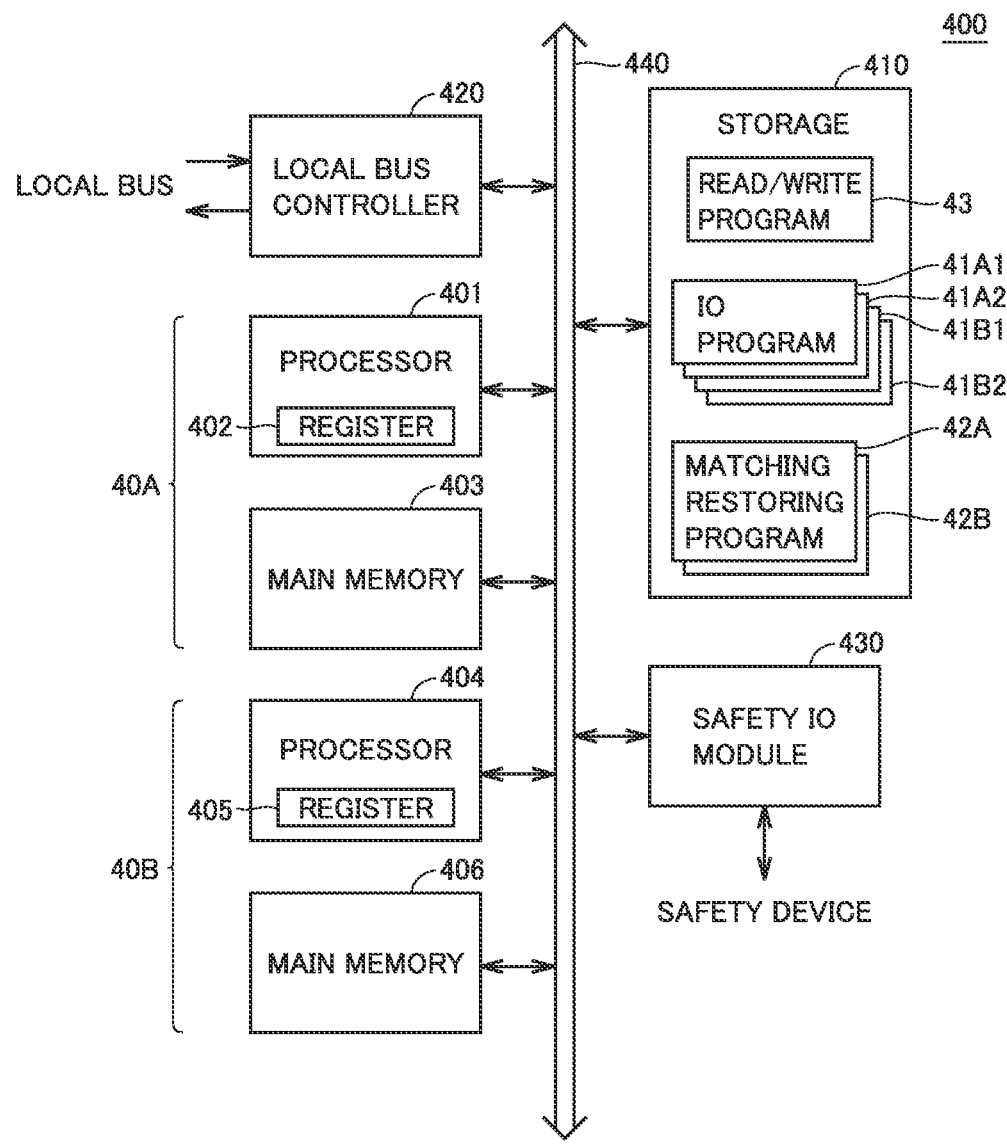
FIG. 13 is a schematic diagram illustrating a hardware configuration example of a safety IO unit according to a second specific example.

FIG. 13 is a schematic diagram illustrating a hardware configuration example of the safety IO unit according to the second specific example. Safety IO unit 400 illustrated in FIG. 13 is different from safety IO unit 400 illustrated in FIG. 7 only in that storage 410 stores a read/write program 43.

Processor 401 writes and reads data to and from main memory 403 in accordance with read/write program 43. Similarly, processor 404 writes and reads data to and from main memory 406 in accordance with read/write program 43.

<Writing and Reading of Data to/from Main Memory>

Figure 14:
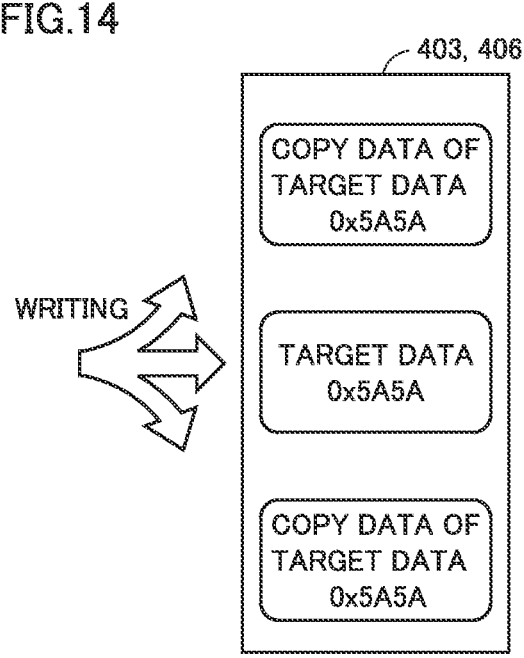
FIG. 14 is a diagram illustrating processing of writing data to a main memory.

FIG. 14 is a diagram illustrating processing of writing data to the main memory. As illustrated in FIG. 14, when writing target data to be written to main memories 403 and 406, processors 401 and 404 copy the target data twice, and write also the copied two pieces of copy data to main memories 403 and 406, respectively. As described above, in each of main memories 403 and 406, the target data and the two pieces of copy data are simultaneously written. As a result, data is triplicated in each of the main memories 403 and 406.

Immediately after the writing, the target data and the two pieces of copy data are the same. However, when a soft error occurs due to, for example, the influence of cosmic rays or neutron rays, data corruption occurs in any one of the target data and the two pieces of copy data.

Figure 15:
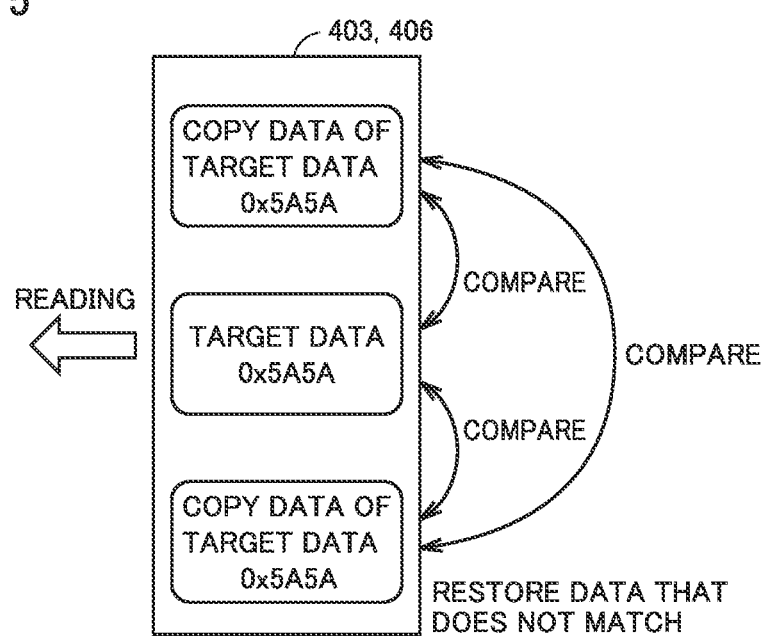
FIG. 15 is a diagram illustrating processing of reading data from the main memory.

FIG. 15 is a diagram illustrating processing of reading data from the main memory. As illustrated in FIG. 15, when reading target data to be read from main memories 403 and 406, processors 401 and 404 also read two pieces of copy data together with the target data. Each of processors 401 and 404 compares the target data and the two pieces of copy data with each other.

In a case where the target data and the two pieces of copy data all coincide with each other, each of processors 401 and 404 determines that no data corruption occurs in any one of the target data and the two pieces of copy data, and executes the arithmetic task using the target data.

In a case where two pieces of data among the target data and the two pieces of copy data match each other and the remaining one piece of data does not match, each of processors 401 and 404 determines that no data corruption occurs in the two pieces of matching data but data corruption occurs in the remaining one piece of data. Then, each of processors 401 and 404 writes one of the two pieces of matching data over a region where the remaining one piece of data is stored. As a result, data having data corruption is restored. Thereafter, each of processors 401 and 404 performs the arithmetic task using one of the two pieces of matching data.

Due to the above processing, even if data corruption occurs in any one of the target data and the two pieces of copy data, the corrupted data is restored in the reading processing, and the arithmetic task is continued.

<Example of Processing in Safety IO Unit>

Figure 16:
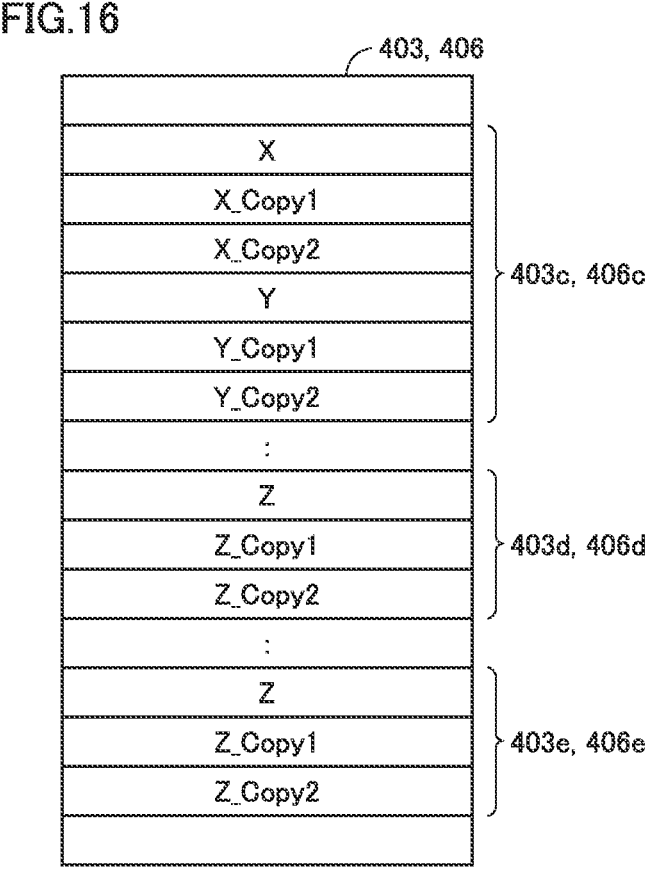
FIG. 16 is a diagram illustrating a region of the main memory according to the second specific example.

The processing using two processing circuits in the second specific example will be described with reference to FIGS. 16 to 20. FIG. 16 is a diagram illustrating a region of a main memory according to the second specific example. As illustrated in FIG. 16, main memory 403 includes regions 403*c*, 403*d*, and 403*e*. Main memory 406 includes regions 406*d*, 406*d*, and 406*e*.

In regions 403*c* and 406*c*, reading of data is only performed during arithmetic tasks. Region 403*c* is used in both first arithmetic task T1 and second arithmetic task T2 executed by processor 401. Region 406*c* is used in both first arithmetic task T3 and second arithmetic task T4 executed by processor 404.

In regions 403*d*, 403*e*, 406*d*, and 406*e*, writing of data is performed during arithmetic tasks. Region 403*d* is used in first arithmetic task T1 executed by processor 401. Region 403*e* is used in second arithmetic task T2 executed by processor 401. Region 406*d* is used in first arithmetic task T3 executed by processor 404. Region 406*e* is used in second arithmetic task T4 executed by processor 404.

Figure 17:
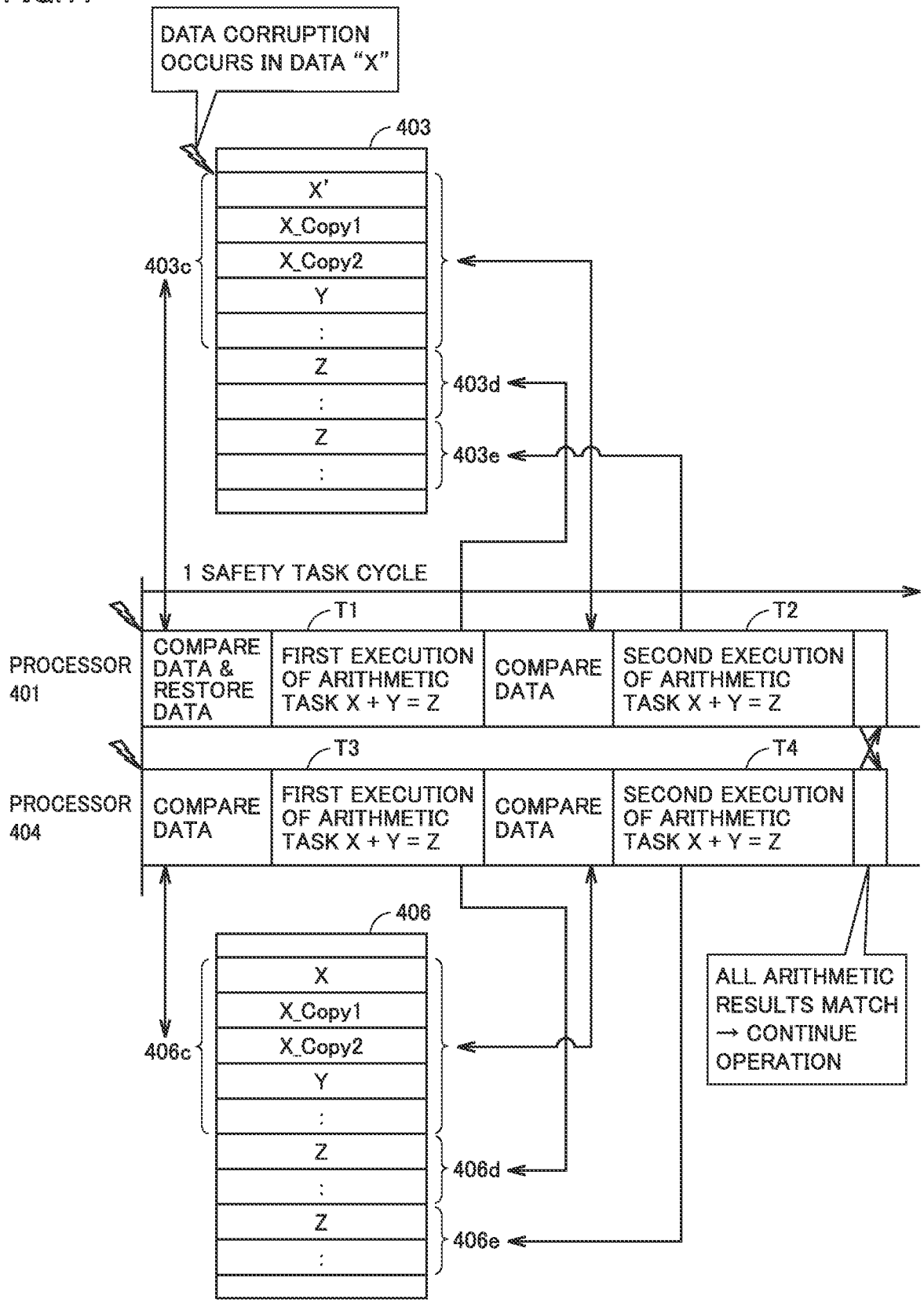
FIG. 17 is a diagram illustrating processing using two processing circuits when data corruption occurs in the second specific example.
Figure 18:
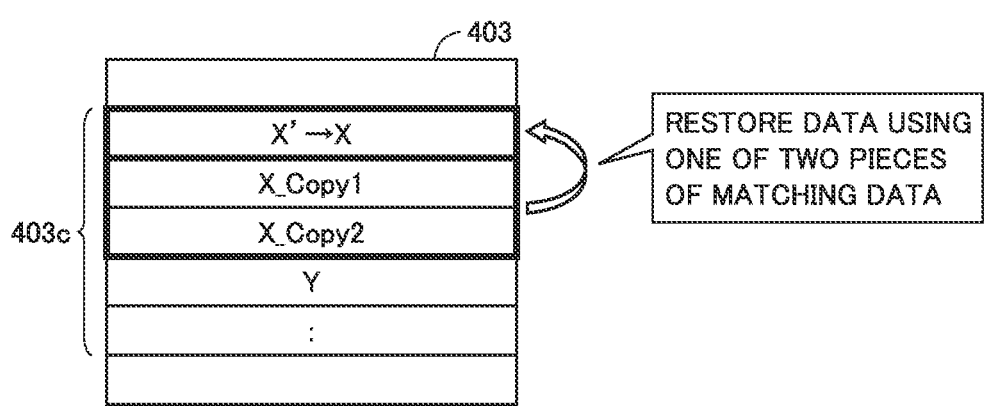
FIG. 18 is a diagram illustrating an example of processing for restoring data "X" illustrated in FIG. 17.

FIG. 17 is a diagram illustrating processing using two processing circuits when data corruption occurs in the second specific example. FIG. 18 is a diagram illustrating an example of processing for restoring data "X" illustrated in FIG. 17.

As illustrated in FIG. 17, processor 401 in A-channel circuit 40A executes same arithmetic tasks T1 and T2 consecutively in the safety task cycle. Processor 401 executes arithmetic tasks T1 and T2 using data "X" and "Y" stored in region 403*c* of main memory 403. Processor 401 writes the results (data "Z") of arithmetic tasks T1 and T2 in regions 403*d* and 403*e*, respectively. Similarly, processor 404 in B-channel circuit 40B executes same arithmetic tasks T3 and T4 consecutively in the safety task cycle. Processor 404 executes arithmetic tasks T3 and T4 using data "X" and "Y" stored in region 406*c* of main memory 406. Processor 404 writes the results (data "Z") of arithmetic tasks T3 and T4 in regions 406*d* and 406*e*, respectively.

As described above, the data written to each of main memories 403 and 406 is triplicated. Therefore, data "X" and two pieces of copy data "X_Copy1" and "X_Copy2" are written in regions 403*c* and 406*c*. In the example illustrated in FIG. 17, before the start of the arithmetic task, data "X" is changed to data "X'" due to an occurrence of a temporary failure in an area where data "X" is written in main memory 403.

Before executing each of arithmetic tasks T3 and T4, processor 404 reads the target data and the two pieces of copy data from region 406*c* of main memory 406, and compares these three pieces of data. In the example illustrated in FIG. 17, a temporary failure does not occur in main memory 406. Therefore, the target data (data "X" and "Y") and the two pieces of copy data thereof coincide with each other. Since the target data matches the two pieces of copy data, processor 404 executes arithmetic tasks T3 and T4 using the target data (data "X" and "Y").

Similarly, before executing each of arithmetic tasks T1 and T2, processor 401 reads the target data and the two pieces of copy data from region 403*c* of main memory 403, and compares these three pieces of data. Since data "X" is changed to data "X'", data "X'" does not match the two pieces of copy data "X_Copy1" and "X_Copy2". On the other hand, the two pieces of copy data "X_Copy1" and "X_Copy2" coincide with each other. Therefore, as illustrated in FIG. 18, processor 401 overwrites data "X'" with one of the two pieces of copy data "X_Copy1" and "X_Copy2" that coincide with each other. As a result, data "X'" is restored to data "X" before arithmetic task T1. As a result, processor 401 can execute arithmetic tasks T1 and T2 using restored data "X" (or copy data "X_Copy1" and "X_Copy2"). That is, as illustrated in FIG. 17, even if data "X'" indicates an address, processor 401 can continue arithmetic tasks T1 and T2 without determining an occurrence of an exception (abnormality).

Then, arithmetic tasks T1 to T4 are executed using correct data, so that the results of arithmetic tasks T1 to T4 match.

Thus, processors 401 and 404 continue to operate on the basis of the results of arithmetic tasks T1 to T4.

Figure 19:
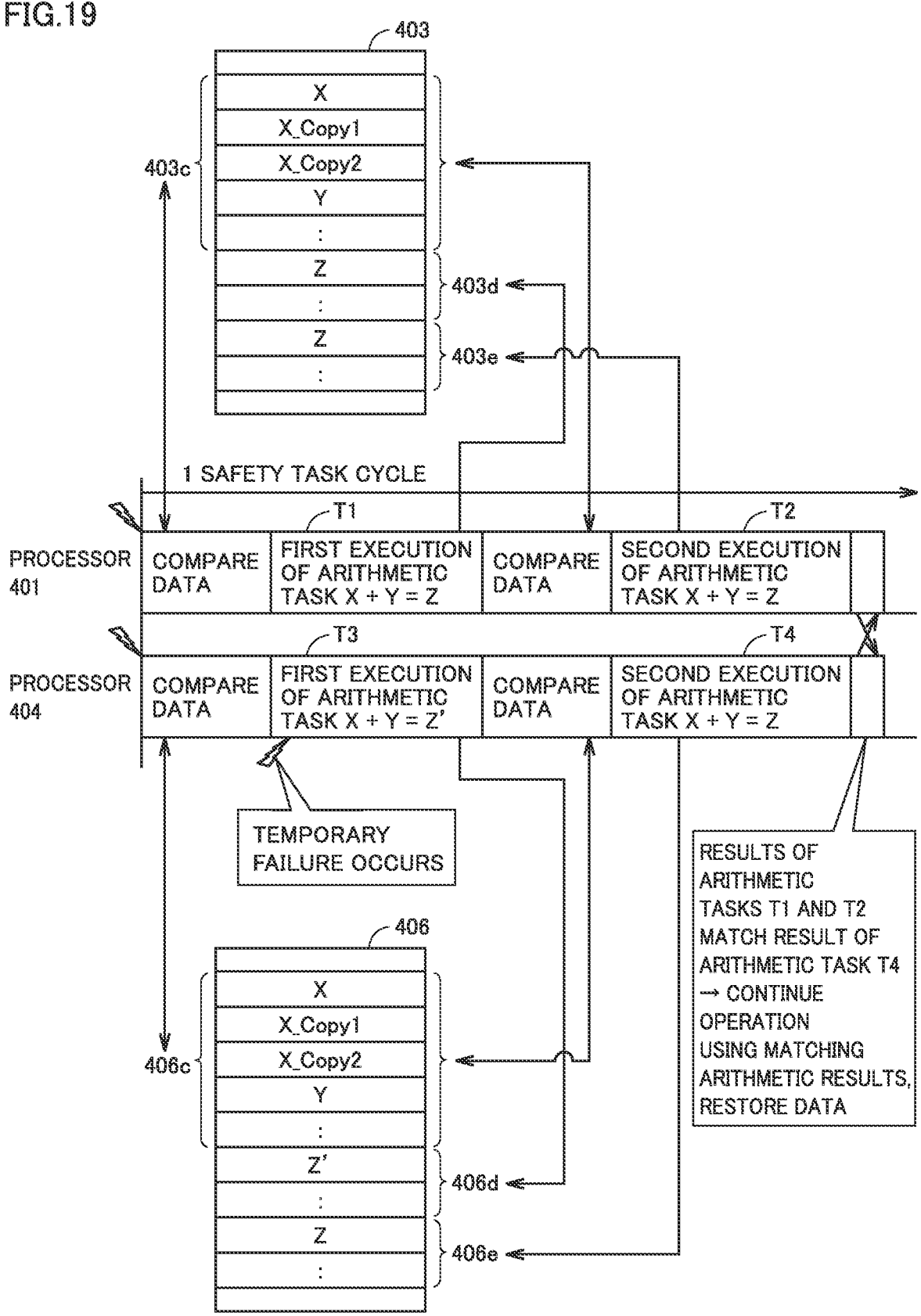
FIG. 19 is a diagram illustrating processing using two processing circuits when a temporary failure occurs in the second specific example.
Figure 20:
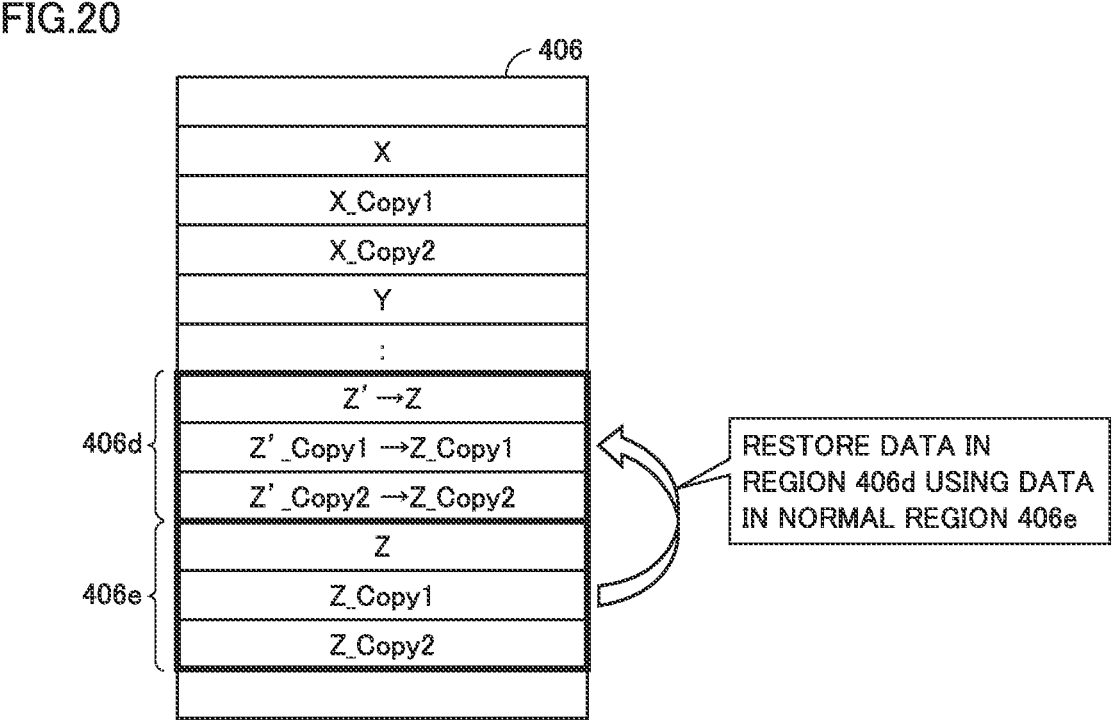
FIG. 20 is a diagram illustrating an example of processing for restoring data "Z" illustrated in FIG. 19.

FIG. 19 is a diagram illustrating processing using two processing circuits when a temporary failure occurs during the execution of the arithmetic task in the second specific example. FIG. 20 is a diagram illustrating an example of processing for restoring data "Z" illustrated in FIG. 19.

As illustrated in FIG. 19, a temporary failure occurs during the execution of arithmetic task T3 by processor 404, and an arithmetic result (data "Z'") different from results (data "Z") of other arithmetic tasks is written in region 406d. However, since the results of arithmetic tasks T1, T2, and T4 match, processors 401 and 404 determine that arithmetic tasks T1, T2, and T4 have been normally executed, and continue to operate on the basis of the results of arithmetic tasks T1, T2, and T4. As described above, even if a temporary failure occurs during the execution of the arithmetic task, the operation of safety IO unit 400 is continued, and the temporary stop of control system 1 can be avoided.

Furthermore, as illustrated in FIG. 20, processor 404 writes the data of region 406e in which the result of arithmetic task T4 that has been normally executed is written over region 406d in which the result of arithmetic task T3 is written. As a result, erroneous data "Z'" is restored to normal data "Z".

<Operation and Effect>

As described above, according to the second specific example, when writing the target data used for arithmetic tasks T1 and T2 to main memory 403, processor 401 also writes two pieces of copy data obtained by copying the target data to main memory 403. Similarly, when writing the target data used for arithmetic tasks T3 and T4 to main memory 406, processor 404 also writes two pieces of copy data obtained by copying the target data to main memory 406.

In addition, before executing each of arithmetic tasks T1 and T2, processor 401 reads the target data and the two pieces of copy data from main memory 403. Similarly, before executing each of arithmetic tasks T3 and T4, processor 404 reads the target data and the two pieces of copy data from main memory 406. According to a match between two or more pieces of data among the target data and the two pieces of copy data which have been read, each of processors 401 and 404 executes the arithmetic task using the two or more pieces of matching data.

According to the above configuration, even if data corruption occurs in any one of the target data and the two pieces of copy data in each of main memories 403 and 406, the arithmetic task is executed using the remaining two pieces of data. As a result, even when data corruption occurs due to a temporary failure, the arithmetic task is executed using correct data in which data corruption does not occur, and the operation can be continued on the basis of the result of the arithmetic task.

According to a match between two pieces of data among the target data and the two pieces of copy data and a mismatch between the remaining one piece of data and the two pieces of data, each of the processors 401 and 404 writes one of the two pieces of data over the region where the one piece of data has been stored.

According to the above configuration, corrupted data is restored to correct data. Thus, it is possible to prevent erroneous data from being taken over to the next arithmetic task.

Processor 401 writes the results of arithmetic tasks T1 and T2 into two different regions 403d and 403e of main memory 403, respectively. Similarly, processor 404 writes the results of arithmetic tasks T3 and T4 into two different regions 406d and 406e of main memory 406, respectively. According to a match between at least one of the results of arithmetic tasks T1 and T2 and at least one of the results of arithmetic tasks T3 and T4, processors 401 and 404 continue to operate on the basis of the matching result (common result).

Processor 401 overwrites the data of the region where a result different from the common result is written among regions 403d and 403e of main memory 403 with the data of the region where the common result is written. Similarly, processor 404 overwrites the data of the region where a result different from the common result is written among regions 406d and 406e of main memory 406 with the data of the region where the common result is written.

According to the above configuration, erroneous data is restored to correct data. Thus, it is possible to prevent erroneous data from being taken over to the next arithmetic task.

§ 4 MODIFICATGION

First Modification

In the above first and second specific examples, each of processors 401 and 404 executes the arithmetic task twice consecutively in each safety task cycle. However, each of processors 401 and 404 may execute the arithmetic task N times consecutively in each safety task cycle. N is an integer of 2 or more.

Note that, in a modification of the first specific example, processor 401 executes N arithmetic tasks using N different regions in main memory 403, respectively. Similarly, processor 404 executes N arithmetic tasks using N different regions in main memory 406, respectively.

In addition, in a modification of the second specific example, processor 401 writes the results of the N arithmetic tasks in N different regions in main memory 403, respectively. Similarly, processor 404 writes the results of the N arithmetic tasks in N different regions in main memory 406, respectively.

Processors 401 and 404 determine whether or not the following condition A is satisfied.

Condition A: At least one first result among results (first results) of the N arithmetic processes executed by processor 401 matches at least one second result among results (second results) of the N arithmetic processes executed by processor 404.

Then, it is only sufficient that processors 401 and 404 continue to operate on the basis of the at least one first result and the at least one second result according to the satisfaction of condition A.

Further, in addition to the above condition A, processors 401 and 404 may determine whether or not the following condition B is satisfied.

Condition B: Not less than a reference number of results among results of 2N arithmetic tasks match the at least one first result (or the at least one second result). The reference number is, for example, an integer of 3 or more.

Then, processors 401 and 404 may continue to operate on the basis of the at least one first result and the at least one second result according to the satisfaction of conditions A and B.

The reference number may be set to a number exceeding N. When, for example, N=2, according to a match among three or more results of four arithmetic tasks, processors 401 and 404 may continue to operate on the basis of the three or more results. When, for example, N=3, according to a match among four or more results of six arithmetic tasks, processors 401 and 404 may continue to operate on the basis of the four or more results. As a result, even if a temporary failure occurs in less than half of the 2N arithmetic tasks, the operation of safety IO unit 400 can be continued.

Second Modification

In the above description, safety IO unit 400 includes two processing circuits (A-channel circuit 40A and B-channel circuit 40B). However, at least one of standard PLC 100, safety PLC 200, and coupler 300 may include two processing circuits, and the two processing circuits may execute the same processing as A-channel circuit 40A and B-channel circuit 40B described above. As a result, at least one of standard PLC 100, safety PLC 200, and coupler 300 can continue to operate even if a temporary failure occurs. As a result, the frequency of stop of control system 1 is suppressed.

In a case where the second modification is combined with the first modification, a different reference number may be set for each device according to characteristics required for the device. For example, the reliability of the result of the arithmetic task required in control PLC 100 is lower than the reliability of the result of the arithmetic task required in safety IO unit 400. Therefore, the reference number set in control PLC 100 may be smaller than the reference number set in safety IO unit 400.

§ 5 SUPPLEMENTARY MATTER

As described above, the present embodiment includes the following disclosures.
(Configuration 1)
An information processing device (400) that executes an arithmetic process, the information processing device (400) comprising:
 a first processing circuit (40A); and
 a second processing circuit (40B),
 wherein
 the first processing circuit (40A) executes the arithmetic process N times consecutively,
 the second processing circuit (40B) executes the arithmetic process N times consecutively,
 N is an integer of 2 or more, and
 according to a match between at least one first result among first results of the N arithmetic processes executed by the first processing circuit (40A) and at least one second result among second results of the N arithmetic processes executed by the second processing circuit (40B), the first processing circuit (40A) and the second processing circuit (40B) continue to operate on the basis of the at least one first result and the at least one second result.
(Configuration 2)
The information processing device (400) according to configuration 1, wherein the first processing circuit (40A) includes a first memory (403) and a first processor (401) configured to execute the arithmetic process using the first memory (403),
 the second processing circuit (40B) includes a second memory (406) and a second processor (404) configured to execute the arithmetic process using the second memory (406),
 the first processor (401) executes the N arithmetic processes using N regions (403a, 403b) different from each other of the first memory (403), respectively, and the second processor (404) executes the N arithmetic processes using N regions (406a, 406b) different from each other of the second memory (406), respectively.
(Configuration 3)
The information processing device (400) according to configuration 2, wherein the first processor (401) overwrites data of a region used in the arithmetic process that outputs a result different from the at least one first result among the N regions (403a, 403b) of the first memory (403) with data of a region used in the arithmetic process that outputs the at least one first result, and the second processor (404) overwrites data of a region used in the arithmetic process that outputs a result different from the at least one second result among the N regions (406a, 406b) of the second memory (406) with data of a region used in the arithmetic process that outputs the at least one second result.
(Configuration 4)
The information processing device (400) according to configuration 1, wherein
 the first processing circuit (40A) includes a first memory (403) and a first processor (401) configured to execute the arithmetic process using the first memory (403),
 the second processing circuit (40B) includes a second memory (406) and a second processor (404) configured to execute the arithmetic process using the second memory (406),
 the first processor (401) writes two pieces of copy data obtained by copying target data used for the arithmetic process to the first memory (403) together with the target data when writing the target data to the first memory (403),
 the second processor (404) writes two pieces of copy data obtained by copying target data used for the arithmetic process to the second memory (406) together with the target data when writing the target data to the second memory (406),
 the first processor (401) is further configured to read the target data and the two pieces of copy data from the first memory (403) before executing the arithmetic process, and
  according to a match between two or more pieces of data among the target data and the two pieces of copy data which have been read, execute the arithmetic process using the two or more pieces of data that match, and
 the second processor (404) is further configured to read the target data and the two pieces of copy data from the second memory (406) before executing the arithmetic process, and
  according to a match between two or more pieces of data among the target data and the two pieces of copy data which have been read, execute the arithmetic process using the two or more pieces of data that match.
(Configuration 5)
The information processing device (400) according to configuration 4, wherein, according to a match between two pieces of data among the target data and the two pieces of copy data and a mismatch between remaining one piece of data and the two pieces of data, the first processor (401) writes one of the two pieces of data over a region storing the remaining one piece of data in the first memory (403), and according to a match between two pieces of data among the target data and the two pieces of copy data and a mismatch between remaining one piece of data and the two pieces of data, the second processor (404) writes one of the two pieces of data over a region storing the remaining one piece of data in the second memory (406).
(Configuration 6)
The information processing device (400) according to configuration 4 or 5, wherein the first processor (401) writes results of the N arithmetic processes in N regions (403*d*, 403*e*) different from each other of the first memory (403), respectively, the second processor (404) writes results of the N arithmetic processes in N regions (406*d*, 406*e*) different from each other of the second memory (406), respectively, the first processor (401) overwrites data of a region in which a result different from the at least one first result is written among the N regions (403*d*, 403*e*) of the first memory (403) with data of a region in which the at least one first result is written, and the second processor (404) overwrites data of a region in which a result different from the at least one second result is written among the N regions (406*d*, 406*e*) of the second memory (406) with data of a region in which the at least one second result is written.

(Configuration 7)

A control method for an information processing device (400) that executes an arithmetic process, the information processing device (400) including a first processing circuit (40A), and a second processing circuit (40B), the control method comprising:

executing the arithmetic process N times consecutively by the first processing circuit (40A); and executing the arithmetic process N times consecutively by the second processing circuit (40B), N being an integer of 2 or more, the control method further comprising according to a match between at least one first result among first results of the N arithmetic processes executed by the first processing circuit (40A) and at least one second result among second results of the N arithmetic processes executed by the second processing circuit (40B), continuing operation of the first processing circuit (40A) and the second processing circuit (40B) on the basis of the at least one first result and the at least one second result.

(Configuration 8)

A program for causing a computer to execute the control method according to configuration 7.

While the embodiment of the present invention has been described, it should be understood that the embodiment disclosed herein is illustrative in all respects and not restrictive. The scope of the present invention is defined by the claims, and is intended to include meanings equivalent to the claims and all modifications within the scope.

REFERENCE SIGNS LIST

1: control system, 2: field network, 40A: A-channel circuit, 40B: B-channel circuit, 41A1, 41A2, 41B1, 41B2: IO program, 42A, 42B: matching restoring program, 43: read/write program, 100: standard PLC, 102, 202, 302, 401, 404: processor, 104, 204, 304, 403, 406: main memory, 108, 308: field network controller, 110, 210, 310, 410: storage, 116, 216, 316, 420: local bus controller, 118, 218, 318, 440: processor bus, 200: safety PLC, 300: coupler, 400: safety IO unit, 402, 405: register, 403*a*; to 403*e*, 406*a* to 406*e*: region, 430: safety IO module, 1102, 2102, 3102: system program, 1104: standard control program, 1106, 2106, 3106: setting information, 2104: safety program, T1 to T4: arithmetic task

The invention claimed is:

1. An information processing device that executes an arithmetic process, the information processing device comprising:

a first processing circuit; and a second processing circuit, wherein the first processing circuit executes the arithmetic process N times consecutively, the second processing circuit executes the arithmetic process N times consecutively, N is an integer of 2 or more, according to a match between at least one first result among first results of the N arithmetic processes executed by the first processing circuit and at least one second result among second results of the N arithmetic processes executed by the second processing circuit, the first processing circuit and the second processing circuit continue to operate based on the at least one first result and the at least one second result, the first processing circuit includes a first memory and a first processor configured to execute the arithmetic process using the first memory, the second processing circuit includes a second memory and a second processor configured to execute the arithmetic process using the second memory, the first processor executes the N arithmetic processes using N regions different from each other of the first memory, respectively, and the second processor executes the N arithmetic processes using N regions different from each other of the second memory, respectively.

2. The information processing device according to claim 1, wherein the first processor overwrites data of a region used in the arithmetic process that outputs a result different from the at least one first result among the N regions of the first memory with data of a region used in the arithmetic process that outputs the at least one first result, and the second processor overwrites data of a region used in the arithmetic process that outputs a result different from the at least one second result among the N regions of the second memory with data of a region used in the arithmetic process that outputs the at least one second result.

3. The information processing device according to claim 1, wherein the first processor writes two pieces of copy data obtained by copying target data used for the arithmetic process to the first memory together with the target data when writing the target data to the first memory, the second processor writes two pieces of copy data obtained by copying target data used for the arithmetic process to the second memory together with the target data when writing the target data to the second memory, the first processor is further configured to read the target data and the two pieces of copy data from the first memory before executing the arithmetic process, and according to a match between two or more pieces of data among the target data and the two pieces of copy data which have been read, execute the arithmetic process using the two or more pieces of data that match, and the second processor is further configured to read the target data and the two pieces of copy data from the second memory before executing the arithmetic process, and according to a match between two or more pieces of data among the target data and the two pieces of copy data which have been read, execute the arithmetic process using the two or more pieces of data that match.

4. The information processing device according to claim 3, wherein,
according to a match between two pieces of data among the target data and the two pieces of copy data and a mismatch between a remaining one piece of data and the two pieces of data, the first processor writes one of the two pieces of data over a region storing the remaining one piece of data in the first memory, and
according to a match between two pieces of data among the target data and the two pieces of copy data and a mismatch between a remaining one piece of data and the two pieces of data, the second processor writes one of the two pieces of data over a region storing the remaining one piece of data in the second memory.

5. The information processing device according to claim 3, wherein
the first processor writes results of the N arithmetic processes in N regions different from each other of the first memory, respectively,
the second processor writes results of the N arithmetic processes in N regions different from each other of the second memory, respectively,
the first processor overwrites data of a region in which a result different from the at least one first result is written among the N regions of the first memory with data of a region in which the at least one first result is written, and
the second processor overwrites data of a region in which a result different from the at least one second result is written among the N regions of the second memory with data of a region in which the at least one second result is written.

6. A control method for controlling an information processing device that executes an arithmetic process, the information processing device including
a first processing circuit, and
a second processing circuit,
the control method comprising:
executing the arithmetic process N times consecutively by the first processing circuit; and
executing the arithmetic process N times consecutively by the second processing circuit,
N being an integer of 2 or more,
the control method further comprising
according to a match between at least one first result among first results of the N arithmetic processes executed by the first processing circuit and at least one second result among second results of the N arithmetic processes executed by the second processing circuit, continuing operation of the first processing circuit and the second processing circuit based on the at least one first result and the at least one second result,
wherein:
the first processing circuit includes a first memory and a first processor configured to execute the arithmetic process using the first memory,
the second processing circuit includes a second memory and a second processor configured to execute the arithmetic process using the second memory,
executing the arithmetic process N times consecutively by the first processing circuit includes executing the N arithmetic processes using N regions different from each other of the first memory, respectively, and
executing the arithmetic process N times consecutively by the second processing circuit includes executing the N arithmetic processes using N regions different from each other of the second memory, respectively.

7. A non-transitory computer readable medium comprising instructions which, when executed, causes a computer having a first processing circuit and a second processing circuit to:
execute an arithmetic process N times consecutively by the first processing circuit, N being an integer of 2 or more;
execute the arithmetic process N times consecutively by the second processing circuit; and
according to a match between at least one first result among first results of the N arithmetic processes executed by the first processing circuit and at least one second result among second results of the N arithmetic processes executed by the second processing circuit, continue operation of the first processing circuit and the second processing circuit based on the at least one first result and the at least one second result,
wherein:
the first processing circuit includes a first memory and a first processor configured to execute the arithmetic process using the first memory,
the second processing circuit includes a second memory and a second processor configured to execute the arithmetic process using the second memory,
executing the arithmetic process N times consecutively by the first processing circuit includes executing the N arithmetic processes using N regions different from each other of the first memory, respectively, and
executing the arithmetic process N times consecutively by the second processing circuit includes executing the N arithmetic processes using N regions different from each other of the second memory, respectively.

8. The control method according to claim 6, further comprising:
overwriting, by the first processor, data of a region used in the arithmetic process that outputs a result different from the at least one first result among the N regions of the first memory with data of a region used in the arithmetic process that outputs the at least one first result, and
overwriting, by the second processor, data of a region used in the arithmetic process that outputs a result different from the at least one second result among the N regions of the second memory with data of a region used in the arithmetic process that outputs the at least one second result.

9. The control method according to claim 6, wherein
the control method further comprises:
writing, by the first processor, two pieces of copy data obtained by copying target data used for the arithmetic process to the first memory together with the target data when writing the target data to the first memory;
writing, by the second processor, two pieces of copy data obtained by copying target data used for the arithmetic process to the second memory together with the target data when writing the target data to the second memory;
reading, by the first processor, the target data and the two pieces of copy data from the first memory before executing the arithmetic process;
according to a match between two or more pieces of data among the target data and the two pieces of copy data which have been read, executing the arithmetic process using the two or more pieces of data that match by the first processor;

reading, by the second processor, the target data and the two pieces of copy data from the second memory before executing the arithmetic process; and according to a match between two or more pieces of data among the target data and the two pieces of copy data which have been read, executing the arithmetic process using the two or more pieces of data that match by the second processor.

10. The control method according to claim 9, further comprising:

according to a match between two pieces of data among the target data and the two pieces of copy data and a mismatch between a remaining one piece of data and the two pieces of data, writing one of the two pieces of data over a region storing the remaining one piece of data in the first memory by the first processor; and according to a match between two pieces of data among the target data and the two pieces of copy data and a mismatch between a remaining one piece of data and the two pieces of data, writing one of the two pieces of data over a region storing the remaining one piece of data in the second memory by the second processor.

11. The control method according to claim 9, further comprising:

writing, by the first processor, results of the N arithmetic processes in N regions different from each other of the first memory, respectively;

writing, by the second processor, results of the N arithmetic processes in N regions different from each other of the second memory, respectively;

overwriting, by the first processor, data of a region in which a result different from the at least one first result is written among the N regions of the first memory with data of a region in which the at least one first result is written; and overwriting, by the second processor, data of a region in which a result different from the at least one second result is written among the N regions of the second memory with data of a region in which the at least one second result is written.

* * * * *